(12) United States Patent
Aoki et al.

(10) Patent No.: US 6,742,411 B2
(45) Date of Patent: *Jun. 1, 2004

(54) BRAKE PEDAL APPARATUS FOR AUTOMOTIVE VEHICLE

(75) Inventors: Tsutomu Aoki, Tochigi-ken (JP); Hiroyuki Mizuma, Kanagawa-ken (JP); Sadahiro Kawahara, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/130,195

(22) PCT Filed: Aug. 15, 2001

(86) PCT No.: PCT/JP01/07040

§ 371 (c)(1),
(2), (4) Date: Aug. 23, 2002

(87) PCT Pub. No.: WO02/22413

PCT Pub. Date: Mar. 21, 2002

(65) Prior Publication Data

US 2003/0029267 A1 Feb. 13, 2003

(30) Foreign Application Priority Data

Sep. 14, 2000 (JP) ........................... 2000-280850
Sep. 14, 2000 (JP) ........................... 2000-280855

(51) Int. Cl.[7] ............................................. G05G 1/14
(52) U.S. Cl. ............................................. 74/512; 74/560
(58) Field of Search ........................ 74/512, 513, 514, 74/516, 560

(56) References Cited

U.S. PATENT DOCUMENTS

| 6,041,674 | A | | 3/2000 | Kato ........................ 74/512 |
|---|---|---|---|---|
| 6,101,894 | A | * | 8/2000 | Tiemann et al. .............. 74/512 |
| 6,112,616 | A | * | 9/2000 | Schonlau et al. ............. 74/512 |
| 6,142,036 | A | * | 11/2000 | Mizuma et al. .............. 74/512 |
| 6,176,340 | B1 | * | 1/2001 | Mizuma et al. .............. 74/512 |
| 6,209,416 | B1 | * | 4/2001 | Tiemann et al. .............. 74/512 |
| 6,279,417 | B1 | * | 8/2001 | Mizuma et al. .............. 74/512 |
| 6,336,376 | B1 | * | 1/2002 | Lee ........................ 74/512 |
| 6,408,711 | B1 | * | 6/2002 | Mizuma et al. .............. 74/512 |
| 2003/0019319 | A1 | * | 1/2003 | Mizuma et al. .............. 74/560 |

FOREIGN PATENT DOCUMENTS

| EP | 0 803 420 A2 | 10/1997 |
|---|---|---|
| EP | 0 810 124 A2 | 12/1997 |
| JP | 6-1113 | 1/1994 |

* cited by examiner

*Primary Examiner*—David A. Bucci
*Assistant Examiner*—Bradley J. Van Pelt
(74) *Attorney, Agent, or Firm*—McDermott, Will & Emery

(57) ABSTRACT

A brake pedal apparatus for an automotive vehicle is disclosed as including a pedal bracket 2, a pivot bracket 3, a slide plate 9 fixedly secured to a vehicular body structural member 41, 52, and an impact absorbing section 10 located between the pedal bracket and the slide plate. During a frontal collision of a vehicle, the impact absorbing section allows the pedal bracket to be contracted and deformed into a position wherein a pedal arm 8 is retracted in a forward direction of the vehicle whereby even when a master vac. is retracted in the forward direction or even when a dash floor panel 40 is deformed into a vehicle compartment with a resultant rearward movement of a push rod 24, a depressing position of the pedal arm remains in a position to avoid a differential feeling touch to be applied to a vehicle driver.

19 Claims, 15 Drawing Sheets

BRAKE PEDAL APPARATUS FOR AUTOMOTIVE VEHICLE

TECHNICAL FIELD

The present invention relates to brake pedal apparatuses for automotive vehicles and more particularly to an improvement over the brake pedal apparatus for an automotive vehicle.

BACKGROUND ART

In recent years, various improvement work has been undertaken to provide a brake pedal apparatus, one typical example of which is disclosed in Japanese Utility Model Provisional Publication No. 6-1113. In such a brake pedal apparatus, a pedal bracket, which pivotally supports an upper portion of a pedal arm, is fixedly connected to a dash floor panel and a lower portion of a dash upper panel connected to the dash floor panel and protruding into a vehicle compartment, with depression of the pedal arm allowing a push rod, which is connected to an upper portion of the pedal arm, to move forward to render a master vac. operative.

DISCLOSURE OF INVENTION

In a structure of the brake pedal of the related art, in the event the master vac. or the dash floor panel, to which the master vac. is fixed, are deformed and moved rearward in the vehicle compartment during a frontal collision of the vehicle, the pedal arm encounters a rotational motion in a direction opposite to a depressing direction of the pedal arm via the push rod of the master vac., with a depressive position of the brake pedal being dislocated from its usual position to an undesired uncomfortable position to provide a differential feeling touch to a vehicle driver.

The present invention has been made in view of the above-described inadequacies of the related art and has an object to provide a brake pedal apparatus for an automotive vehicle wherein a pedal arm is prevented from being subjected to impact load through a push rod of a master vac. during a frontal collision of the automotive vehicle for thereby avoiding a differential feeling touch to be given to a vehicle driver.

It is another object of the present invention to provide

It is another object of the present invention to provide a brake pedal apparatus for an automotive vehicle which can provide an improved assembling work efficiency by ensuring a slide plate and a pivot bracket to be held in engagement with one another to provide an ease of transfer of the brake pedal assembly prior to assembling step thereof to the automotive vehicle.

According to a first aspect of the present invention, there is provided a brake pedal apparatus for an automotive vehicle having a dash floor panel and a vehicular body structural member, which comprises a pedal bracket fixedly secured to a dash floor panel and at a coupling position to a lower wall portion of a vehicular body structural member and carrying thereon a pivot shaft, a pivot bracket pivotally supported on the pivot shaft and having a pedal shaft, a pedal arm pivotally supported on the pedal shaft, a slide plate held in slidable engagement with the pedal bracket, and an impact absorbing section located between the coupling position and the pivot shaft to permit a relative movement of at least the pivot shaft and the lower wall portion of the vehicular body structural member in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft.

According to a second aspect of the present invention, there is provided a brake pedal apparatus for an automotive vehicle having a dash floor panel and a vehicular body structural member, which comprises a pedal bracket fixedly secured to a dash floor panel and at a coupling position to a lower wall portion of a vehicular body structural member and carrying thereon a pivot shaft, a pivot bracket pivotally supported on the pivot shaft and having a pedal shaft, a pedal arm pivotally supported on the pedal shaft, a slide plate held in slidable engagement with the pedal bracket, and an impact absorbing section located between the coupling position and the pivot shaft to permit a relative movement of at least the pivot shaft and the lower wall portion of the vehicular body structural member in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft. A releasable connecting section is located for coupling at least the slide plate and the pivot bracket to one another and operative to release a coupling state between the slide plate and the pivot bracket when the pedal bracket encounters the impact force exerted rearward at the level beyond the given load.

With such a structure, the presence of the slide plate arranged to restrict a pivotal movement of the pivot bracket in a normal condition of the vehicle allows a pedal arm to rotate about a center of a pedal shaft to enable a master vac. to be performed in a normal operation via a push rod coupled to the pedal arm.

During a frontal collision of the vehicle, the shock absorbing section functions to allow the coupling position, between the slide plate and the lower wall portion of the vehicular body structural member, to be retracted relative to the pivot shaft to cause the pivot bracket to disengage from the slide plate for thereby allowing the pivot bracket to pivotally rotate in the counterclockwise direction about the center of the pivot shaft such that the depressing position of the pedal arm is retracted in the forward direction of the vehicle. Consequently, even when the master vac. is moved in the rearward direction of the vehicle or even when the dash floor panel is deformed toward the vehicle compartment to move the push rod of the master vac. in the same direction, it is possible to avoid the depressing position of the pedal arm from dislocating rearward to suffer a differential feeling touch to be given to a vehicle driver.

Further, the presence of the releasable connecting section which couples the pedal bracket and the slide plate to one another and whish is operative to to release the coupling state between the pedal bracket and the slide bracket responsive to the impact force exerted to the pedal bracket rearward in the vehicle at the given load exceeding the given load renders the slide plate and the pedal bracket to be held stationary to restrict the same from moving relative to one another under the condition below the given load. Thus, it is possible for the slide plate and the pivot bracket to be held in engagement with one another during an assembling step or a transferring step of the associated component parts.

According to a third aspect of the present invention, there is provided a brake pedal apparatus for an automotive vehicle having a dash floor panel and a vehicular body structural member, which comprises a pedal bracket fixedly secured to a dash floor panel and at a coupling position to a lower wall portion of a vehicular body structural member and carrying thereon a pivot shaft, a pivot bracket pivotally supported on the pivot shaft and having a pedal shaft a pedal arm pivotally supported on the pedal shaft, a slide plate held in slidable engagement with the pedal bracket, and an impact absorbing section located between the coupling position and the pivot shaft to permit a relative movement of at least the pivot shaft and the lower wall portion of the vehicular body structural member in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft. A restrictor section is located at the coupling point for engaging with a part of the pivot bracket to restrict a pivotal movement thereof in a counterclockwise direction under a condition where the pedal bracket remains in a normal position relative to the vehicular body structural member, the restrictor section being operative to move with the vehicular body structural member relative to the part of the pivot bracket when the pedal bracket encounters the impact force exceeding the given load exerted in the rearward direction of the automotive vehicle.

With such a structure, the presence of the restrictor section, which restricts the pivotal movement of the pivot bracket in engagement with the slide plate during a normal cruising state of the vehicle, allows the pedal arm to rotate about the center of the pedal shaft to cause a master vac. to be performed in a normal operation via a push rod coupled to the pedal arm.

During a frontal collision of the vehicle, the shock absorbing section functions to allow the coupling position, between the slide plate and the lower wall portion of the vehicular body structural member, to be retracted relative to the pivot shaft to cause the pivot bracket to disengage from the slide plate for thereby allowing the pivot bracket to pivotally rotate in the counterclockwise direction about the center of the pivot shaft such that the depressing position of the pedal arm is retracted in the forward direction of the vehicle. Consequently, even when the master vac. is moved in the rearward direction of the vehicle or even when the dash floor panel is deformed toward the vehicle compartment to move the push rod of the master vac. in the same direction, it is possible to avoid the depressing position of the pedal arm from dislocating rearward to suffer a differential feeling touch to be given to a vehicle driver.

Further, the presence of the restrictor section allows the part of the pivot bracket to be engageable with the coupling fixture member, which forms the restrictor section, for preventing the pivot bracket from rotating in the counterclockwise direction about the center of the pivot shaft to minimize the amount of variation in the depressing position of the pedal to alleviate a differential feeling touch to be given to a vehicle driver. Further, when the pedal arm encounters the impact force beyond the given load in the rearward direction of the vehicle, the restrictor section is shifted with the vehicular body structural member relative to the pivot shaft, thereby avoiding the pivot bracket from being disturbed for its pivotal movement.

According to a fourth aspect of the present invention, there is provided a brake pedal apparatus for an automotive vehicle having a dash floor panel and a vehicular body structural member, which comprises a pedal bracket fixedly secured to a dash floor panel and at a coupling-position to a lower wall portion of a vehicular body structural member and carrying thereon a pivot shaft, a pivot bracket pivotally supported on the pivot shaft and having a pedal shaft, a pedal arm pivotally supported on the pedal shaft, a slide plate held in slidable engagement with the pedal bracket, and impact absorbing means allowing at least the pivot shaft and the lower wall portion of the vehicular body structural member to move relative to one another in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft.

According to a fifth aspect of the present invention, there is provided a brake pedal apparatus for an automotive vehicle having a dash floor panel and a vehicular body structural member, which comprises a pedal bracket fixedly secured to a dash floor panel and at a coupling position to a lower wall portion of a vehicular body structural member and carrying thereon a pivot shaft, a pivot bracket pivotally supported on the pivot shaft and having a pedal shaft, a pedal arm pivotally supported on the pedal shaft, a slide plate held in slidable engagement with the pedal bracket, impact absorbing allowing at least the pivot shaft and the lower wall portion of the vehicular body structural member to move relative to one another in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft, and releasable connecting means coupling at least the slide plate and the pedal bracket to one another and operative to release a coupling state between the slide plate and the pedal bracket when the pedal bracket encounters the impact force exerted rearward at the level beyond the given load.

According to a sixth preferred embodiment of the present invention, there is provided a brake pedal apparatus for an automotive vehicle having a dash floor panel and a vehicular body structural member, which comprises a pedal bracket fixedly secured to a dash floor panel and at a coupling position to a lower wall portion of a vehicular body structural member and carrying thereon a pivot shaft, a pivot bracket pivotally supported on the pivot shaft and having a pedal shaft, a pedal arm pivotally supported on the pedal shaft, a slide plate held in slidable engagement with the pedal bracket, impact absorbing means allowing at least the pivot shaft and the lower wall portion of the vehicular body structural member to move relative to one another in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft, and restrictor means restricting a pivotal movement thereof in a counterclockwise direction under a condition where the pedal bracket remains in a normal position relative to the vehicular body structural member, the restrictor section being operative to move with the vehicular body structural member relative to the part of the pivot bracket when the pedal bracket encounters the impact force exceeding the given load exerted in the rearward direction of the automotive vehicle.

Other and further features, advantages, and benefits of the present invention will become more apparent from the following description taken in conjunction with the following drawings.

BEST MODE FOR CARRYING OUT THE INVENTION

To describe the present invention more in detail, a preferred embodiment of the present invention will be explained with reference to the drawings below.

Figure 1:
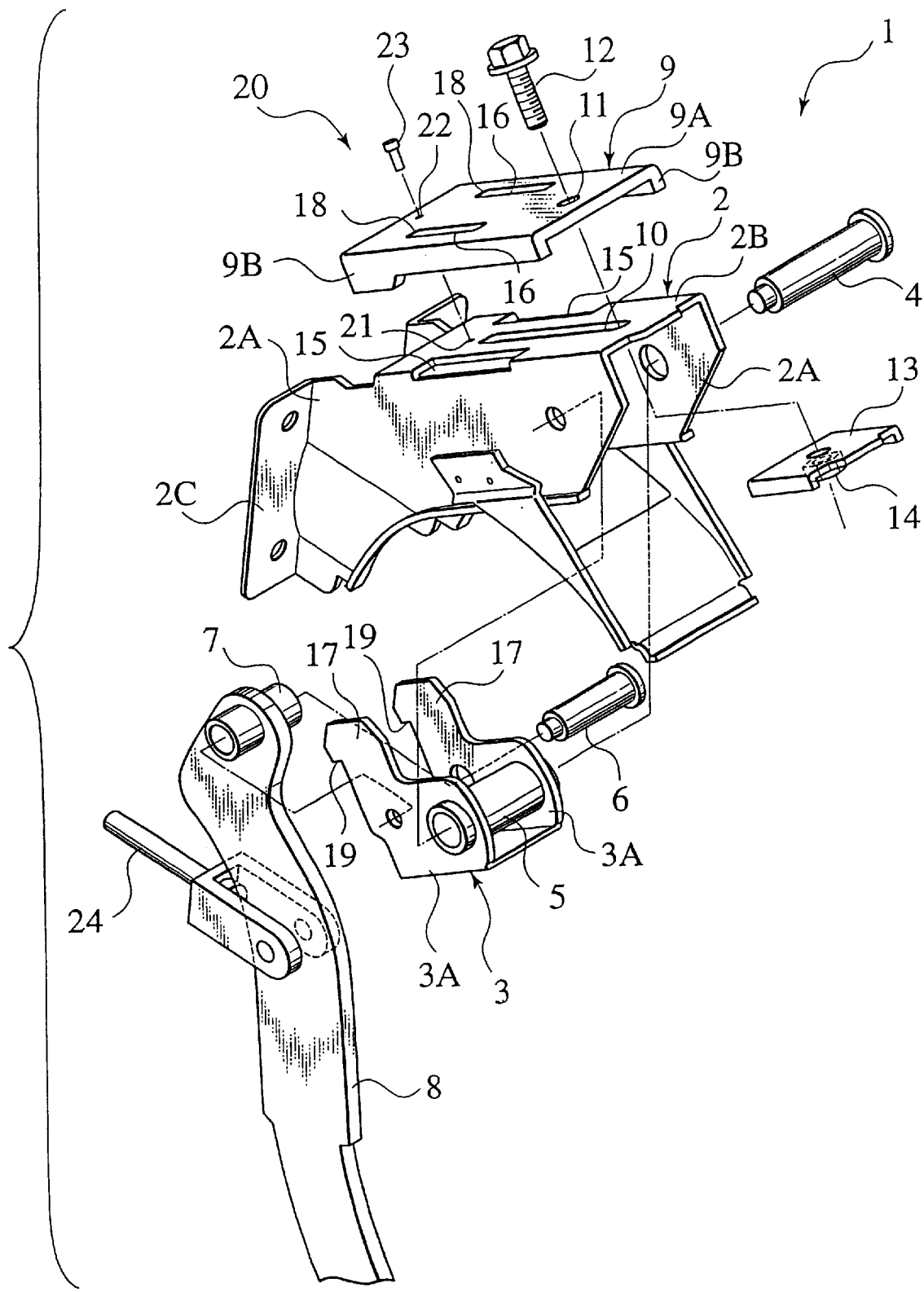
FIG. 1 is a perspective, exploded view of a first preferred embodiment of a brake pedal apparatus according to the present invention.
Figure 2:
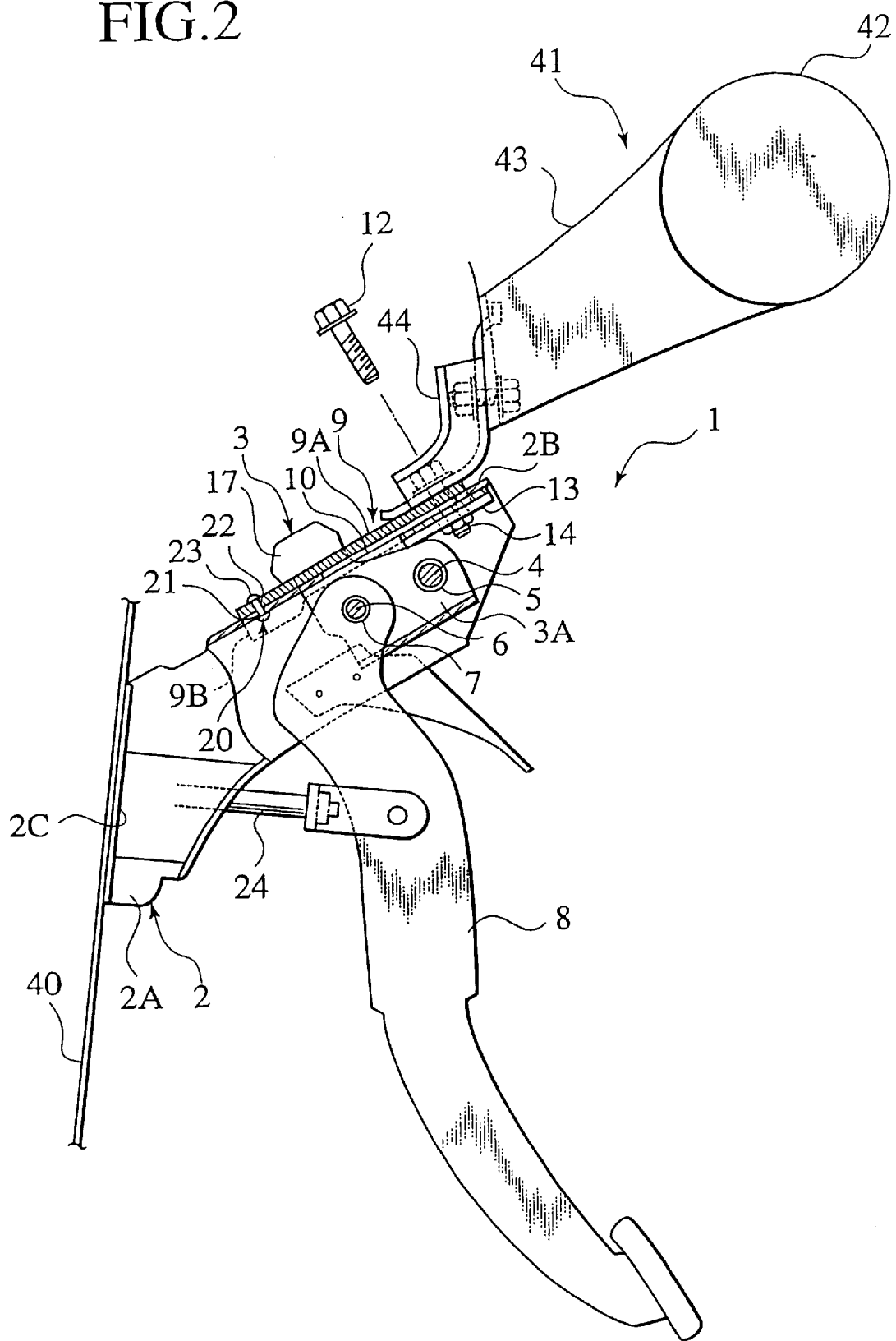
FIG. 2 is a side, cross sectional side view of an essential the brake pedal apparatus shown in FIG. 1.

Referring now to FIGS. 1 and 2, there is shown a brake pedal apparatus 1 for an automotive vehicle of the preferred embodiment according to the present invention. The brake pedal apparatus 1 includes a pedal bracket 2 which has a pair of outwardly extending flange portions 2C firmly fixed to a dash floor panel 40 of a dash panel formed in a front portion of the automotive vehicle by bolts and nuts (not shown).

The pedal bracket 2 has a pair of downwardly extending side wall portions 2A, 2A which are laterally spaced from one another and are interconnected at their upper ends with an upper flat wall portion 2B, thereby forming a substantially C-shaped configuration in cross section. The upper wall portion 2B has a pair of longitudinally extending elongated openings 15, 15 formed in the vicinity of respective forward end portions, and a central elongated bolt insertion slot 10 formed in a longitudinal direction of the pedal bracket 2. The elongated bolt insertion slot 10 functions as an impact absorbing section which maintains the pedal bracket 2 in a first position shown in FIG. 2 during a normal cruising of the automotive vehicle and in a second position during a frontal collision of the automotive vehicle, in a manner as will be described below in detail.

A substantially flat, slide plate 9 is placed over the upper wall portion 2B of the pedal bracket 2 and firmly fixed to a lower wall of a vehicular body structural member 41 extending upward and rearward of the dash floor panel 40.

In the first illustrated embodiment, the slide plate 9 has a downwardly opening, substantially C-shaped cross section having an upper wall 9A formed at its both sides with laterally spaced, downwardly extending flanges 9B, 9B which are covered over the upper wall portion 2B of the pedal bracket 2. A rear distal end of the upper wall portion 9A of the slide plate 9 has a bolt insertion hole 11 and a substantially medium portion of the slide plate 9 has a pair of laterally spaced, elongated slots 16, 16 formed in the vicinity of a forward end portion 18 (i.e., an engaging portion) of the upper wall 9A.

In particular, a rear end portion of the upper wall portion 9A of the slide plate 9 is firmly connected to a lower wall portion of a mounting bracket 44 whose upper end is in turn connected to a bracket 43 coupled to a steering member 42. More specifically, the rear end portion of the slide plate 9 is sandwiched between the lower wall of the mounting bracket 44 and the upper wall portion 2B of the pedal bracket 2, and a nut plate 13, to which a nut 14 is firmly connected by welding, is located on a lower surface of the pedal bracket 2. A coupling fixture member such as a bolt 12 is inserted through a bore (not shown) of the mounting bracket 44, the bolt insertion hole 11 of the slide plate 9 and the bolt insertion slot 10 of the pedal bracket 2, and is screwed into the nut 14 to fixedly secure the rear end portions of the slide plate 9 and the pedal bracket 2 to the lower wall portion of the mounting bracket 44. In the first illustrated embodiment, further, the steering member 42, the bracket 43 and the mounting bracket 44 form the vehicular body structural member 41.

A pivot bracket 3, which has an upwardly opening, substantially C-shaped configuration in cross section, has a collar 5 which is pivotally supported on a pivot shaft 4 mounted to the pedal bracket 2. The pivot bracket 3 has a laterally spaced side plate portions 3A, 3A which carry a pedal shaft 6 at a position forwardly of the pivot shaft 4 in a lengthwise direction of the vehicle, with the pedal shaft 6 pivotally supporting a pedal arm 8 by means of a collar 7.

The pivot bracket 3 includes upwardly extending projective segments 17, 17 which are spaced from one another in a lateral direction and extend through the elongated openings 15, 15 of the pedal bracket 2 and the elongated slots 16, 16 of the slide plate 9, respectively. The projective segments 17, 17 function to normally engages with the slide plate 9 at the respective forward end portions 18, 18 of the slide plate 9 to remain in a first engagement position, wherein the pedal bracket 2 remains in its first position, and is operative to disengage from the slide plate 9 to assist pivotal movement of the pivot bracket 3 such that the pedal bracket 2 is brought into a second, disengagement position.

In the first illustrated embodiment, the provision of the elongated bolt insertion slot 10 formed in the pedal bracket 2 provides the impact absorbing section which is operative to allow the pivot shaft 4 and a lower surface portion of the vehicular body structural member 41 to move relative to one another in forward and aft directions of the vehicle when the pedal bracket 2 encounters an external, impact force applied in a rearward direction of the vehicle at a load exceeding a given level during a frontal collision of the automotive vehicle.

As previously noted above, since the upper wall portion 2B of the pedal bracket 2 has the pair of elongated openings 15, 15 and the upper wall 9A of the slide plate 9 has the pair of elongated slots (opening sections) 16, 16, with the elongated openings 15, 15 and the elongated slots 16, 16 admit the projective segments 17, 17, of the pivot bracket 3 to pass. With such an arrangement, cutout portions 19, 19 which are formed at forward distal ends of the respective projective segments 17, 17 of the pivot bracket 3 and which serve as engaging portions, are held in engagement with the forward end portions (i.e., the engaging portions) 18, 18 of the slide plate 9.

A releasable connecting section 20 is provided for interconnecting the pedal bracket 2 and the slide plate 9 while, when the pedal bracket 2 encounters the external force exerted in the rearward direction at the load exceeding the given level, releasing the interconnecting relationship between the pedal bracket 2 and the slide plate 9 for thereby absorbing an impact energy applied to the pedal bracket 2.

In the first illustrated embodiment, the releasable connecting section 20 is constructed of a shear pin 23 which passes through bores 21 and 22 formed in the upper wall portion 2B of the pedal bracket 2 and the upper wall 9A of the slide plate 9, respectively. Also it is to be noted that the shear pin 23 is generally made of softer material (i.e., for example, plastic resin or aluminum) than the pedal bracket 2 and the slide plate 9.

Further, the releasable connecting section 20 is preferably located in the vicinity of an engagement section between the front edge portion 18 of the slide plate 9 and the cutout portions of the pivot bracket 3. More specifically, in the first preferred embodiment, the releasable connecting section 20 is located in a position slightly forwardly of the aforementioned engagement section in alignment with an extending line of the bolt insertion slot 10 formed in the elongated profile.

During normal cruising of the vehicle corresponding to a non-collision state, consequently, since the forward end portions 18, 18 of the slide plate 9 is held in engagement with the cutout portions 19, 19 formed at the front edge portions of the pivot bracket 3, counterclockwise pivotal movement of the pivot bracket 3 is restricted to allow a depressing position of the pedal arm 8 to be restricted within a given range such that the pedal arm 8 is rotated about the center of the pedal shaft 6, thereby allowing a push rod 24 connected to the pedal arm 8 to achieve a usual master vac. operation without causing any differential touch to be felt by the vehicle driver.

During frontal collision of the vehicle, further, the pedal bracket 2 is moved in the rearward direction of the automotive vehicle relative to the bolt insertion slot 10 of the pedal bracket 2, which forms the impact absorbing section, while shearing the shearing pin 23 of the releasable connecting section 20, thereby causing the pedal bracket 2 to encounter contraction and deformation owing to the rearward movement of the pedal bracket 2. With such a contraction and deformation, since the slide plate 9 fixed to the vehicular body structural member 41 is guided by the upper wall portion 2B of the pedal bracket 2 and is moved in the forward direction relative to the pivot bracket 3, the pivot bracket 3 disengages from the slide plate 9 to allow the pivot bracket 3 to pivotally rotate counterclockwise about the center of the pivot shaft 4 to the second position such that the depressible position of the pedal arm 8 is retracted in the forward direction of the automotive vehicle.

That is, when the pedal shaft 6 of the pedal arm 8 is moved in the rearward direction of the automotive vehicle, the depressible position of the pedal arm 8 is shifted in the forward direction, i.e., to a new depressing position.

In the first illustrated embodiment, as discussed above, since the slide plate 9 is operative to restrict the pivotal motion of the pivot bracket 3 during the normal cruising state of the automotive vehicle, it is possible for the pedal arm 8 to rotate about the center of the pedal shaft 6 to perform the normal master vac. operation via the push rod 24 connected to the pedal arm 8.

On the one hand, when the automotive vehicle encounters the frontal collision, the pivot shaft 4 of the pivot bracket 3 is moved in contractive motion toward the fixed area between the slide plate 9 and the lower end wall of the vehicular body structural member 41 to allow the pivot bracket 3 to disengage from the slide plate 9 and to rotate the pivot bracket 3 counterclockwise about the center of the pivot shaft 4 such that the depressing position of the pedal arm 8 is retracted toward the front side of the automotive vehicle. As a result, even when the master vac. encounters rearward movement or when the dash floor panel 40 is deformed toward the vehicle compartment and the push rod 35 of the master vac. is moved rearward, it is possible for the depressing position of the pedal arm 8 to be prevented from dislocating rearward to cause the differential feeling touch to be applied to the vehicle driver.

Further, the presence of the releasable connecting section 20, which is composed of the pedal bracket 2, the bore 21 of the upper wall portion 2B of the pedal bracket 2, the slide plate 9, the bore 22 of the upper wall portion 9A of the slide plate 9 and the shear pin 23, renders the slide plate 9 and the pedal bracket 2 to be restricted from moving relative to one another to remain in the first position until the slide plate 9 is exerted with the external, impact force beyond the given load and to be operative to release the connecting relationship between the slide plate 9 and the pivot bracket 2 to cause the pivot bracket 2 to move to the second position responsive to the external force exceeding the given load exerted to the pedal bracket 2 in the rearward direction of the automotive vehicle. Thus, it is possible for the slide plate and the pivot bracket 3 to be held in engagement with one another during their assembling work or their transfer of the associated component parts.

In the first illustrated embodiment, further, the provision of the releasable connecting section 20 located in close proximity to the engaging area between the pivot bracket 3 and the slide plate 9 allows the slide plate 9 to be restricted from moving at the engagement area, thereby ensuing a reliable engagement relationship between the pivot bracket 3 and the slide plate 9.

Also, since the releasable connecting section 20 is located forwardly of the aforementioned engagement area between the pivot bracket 3 and the slide plate 9 in the longitudinal direction of the automotive vehicle, the shear pin 23 of the releasable connection section 20 is enabled to be located in an area, which has a relatively wide margin, not to disturb the releasing movement of the slide plate 9, i.e., the area defined forwardly of the elongated bolt insertion slot 10 formed in the upper wall 2B of the pedal bracket 2. Thus, there is no need for increasing the size of the pedal bracket 2, affording the contribution to the compactness of the brake pedal unit 1. In addition, since the margin, in which the shear pin 23 is located, has the relatively wide area, the bolt insertion slot 10 may have a longitudinal length as long as possible. Further, in a general assembling sequence of the brake pedal apparatus 1, although it is a usual practice to assemble the pivot shaft 4 to the pedal bracket 2 and subsequently to couple the pedal bracket 2 with the slide plate 9., the interference between a subassembly of the pedal bracket 2 and the slide plate 9 and other remaining component parts can be effectively avoided to improve the assembling work efficiency even in a case where the slide plate 9 is coupled to the pedal bracket 2 in the coupling work performed in upward and downward orientations without the use of a riveting technique which enables the slide plate 9 to be coupled to the pedal bracket 2 in a single directional orientation.

Since, further, the pedal bracket 2 has the C-shaped configuration in cross section having the pair of the side walls 2A, 2A between which the upper wall portion 2B is integrally formed to allow the releasable connecting section 20 to be located, and has the longitudinally extending openings 15, 15 through which the projective segments 17, 17 extend, respectively, to allow the cutout portions 19, 19 of the pivot bracket 3 to be held in engagement with the slide plate 9, it is possible for the height of a region around the pivot shaft 4, which enables the pivot bracket 3 to be supported by the pedal bracket 2 for the pivotal movement, to be restricted in a limited range to prevent the increase in the whole size of the brake pedal apparatus 1. This results in an increased freedom in the layout in designing the brake pedal apparatus 1, enabling a wide application of the same to various models of the smaller-sized automotive vehicles.

Since, also, the upper wall portion 2B of the pedal bracket 2 and the slide plate 9 are fixedly coupled to the lower wall portion of the vehicle structural member 41 by means of the bolt (i.e., the coupling fixture member) 12 inserted from an upward area in the automotive vehicle, and, as the impact absorbing section, the bolt insertion slot 10 is formed in the elongated profile in the upper wall portion 2B of the pedal bracket 2 to allow the pedal bracket 2 and the slide plate 9 to move relative to one another, the brake pedal apparatus 1 can be constructed in a simplified structure with a reduced cost.

In addition, the management in a coupling torque of the bolt 12 provides an ease of tuning for the impact absorption.

In the first illustrated embodiment, further, since the pedal bracket 2 and the slide plate 9 are fixedly coupled to the vehicular body structural member 41 by inserting the bolt 12 from the upward area in the automotive vehicle, it is possible to fixedly secure the brake pedal device 1 in which the pedal bracket 2 and the pedal arm 8 are preliminarily assembled, to the dash floor panel 40 and subsequently to mount a module, wherein the steering member 42 is connected to the bracket 43, which in turn is connected to the mounting bracket 44, and is connected to a steering column shaft (not shown), to a suitable position at once from a rearward area in the automotive vehicle, thereby improving the assembling work efficiency.

Furthermore, the presence of the releasable connecting section 20 located on the line extending from the bolt insertion slot 10 formed in the upper wall portion 2B of the pedal bracket 2 in the longitudinally extending elongated profile allow the slide plate 9 to move in a stable fashion without causing its deflection during the movement of the pedal bracket 2 and the slide plate 9 relative to one another.

In addition, since the slide plate 9 is located on the upper wall portion 2B of the pedal bracket 2 in an overlapping relationship, the layout of the slide plate 9 is not adversely affected with the shaft 4, which is supported with the pedal bracket 2, and the pivot bracket 3, thereby enhancing the freedom in the layout of the slide plate 9.

Moreover, since the slide plate 9 has the substantially C-shaped configuration having the upper wall portion 9A and the pair of downwardly extending flanges 9B, 9B integral therewith to cover the upper wall portion 2B of the pedal bracket 2, the cross sectional coefficient of the slide plate 9 can be freely selected to a suitable value by varying the vertical height of each flange 9B so as to improve the rigidity of the slide plate 9 responsive to an input load in an easy fashion. Thus, the rigidity of the slide plate 9 can be enhanced with the flanges 9B, 9B, there by rendering the slide plate 9 to be manufactured in a smaller size with a resultant decrease in the size of the brake pedal device 1 so as to be applicable to the various models of the small-sized automotive vehicles.

Also, the presence of the downwardly extending flanges 9B, 9B formed in the slide plate 9 to cover the both sides of the upper wall portion 2B of the pedal bracket 2 allows the flanges 9B, 9B to serve as guides of the slide plate 9 during its longitudinal movement, thereby ensuring the stable movement of the slide plate 9.

A second preferred embodiment of a brake pedal device 1 according to the present invention is described with reference to FIGS. 3 and 4, with like or similar parts bearing the same reference numerals as those used in FIGS. 1 and 2 to omit redundant description of the like parts for the sake of simplicity.

Figure 3:
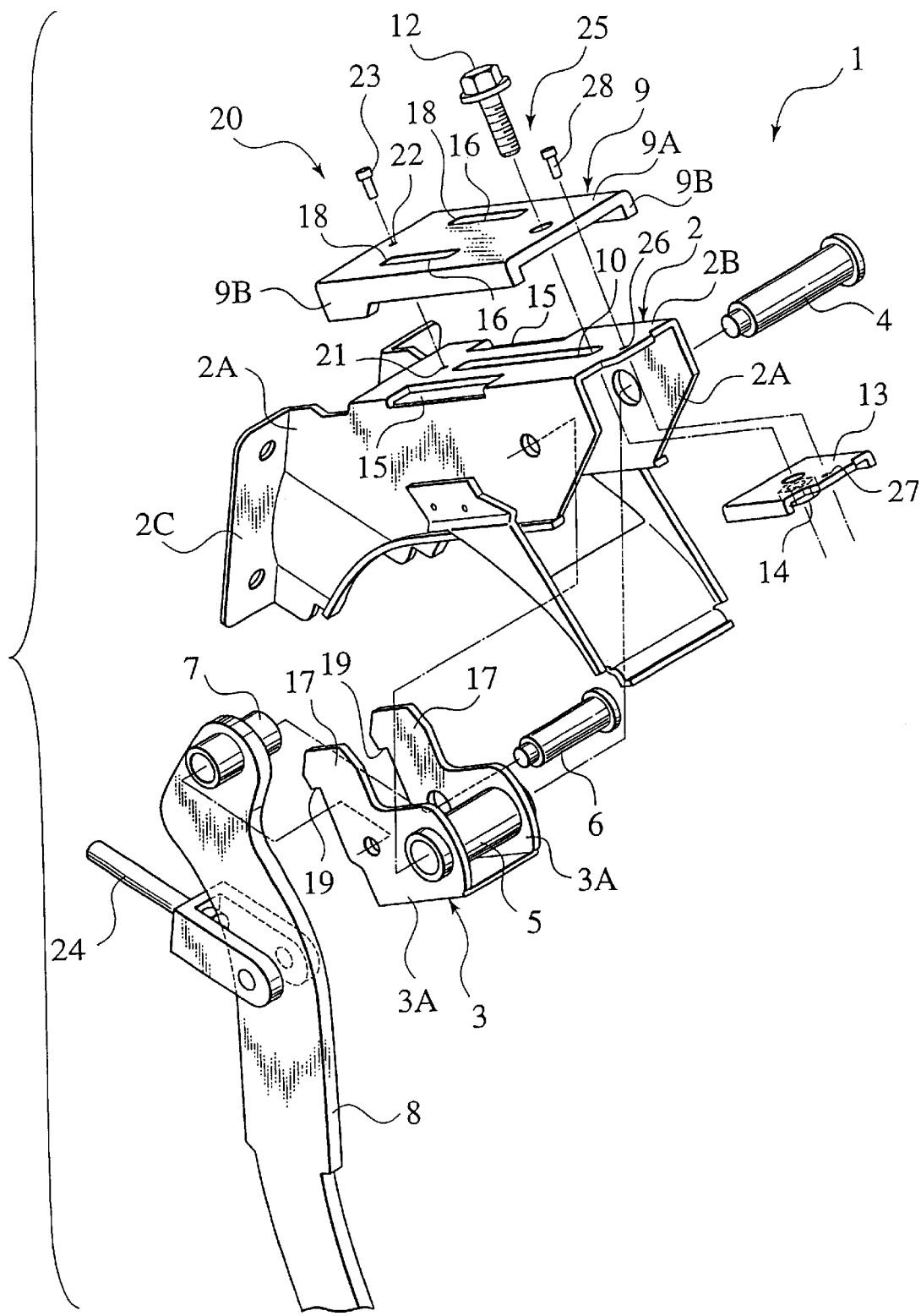
FIG. 3 is a perspective, exploded view of a second preferred embodiment of a brake pedal apparatus according to the present invention.
Figure 4:
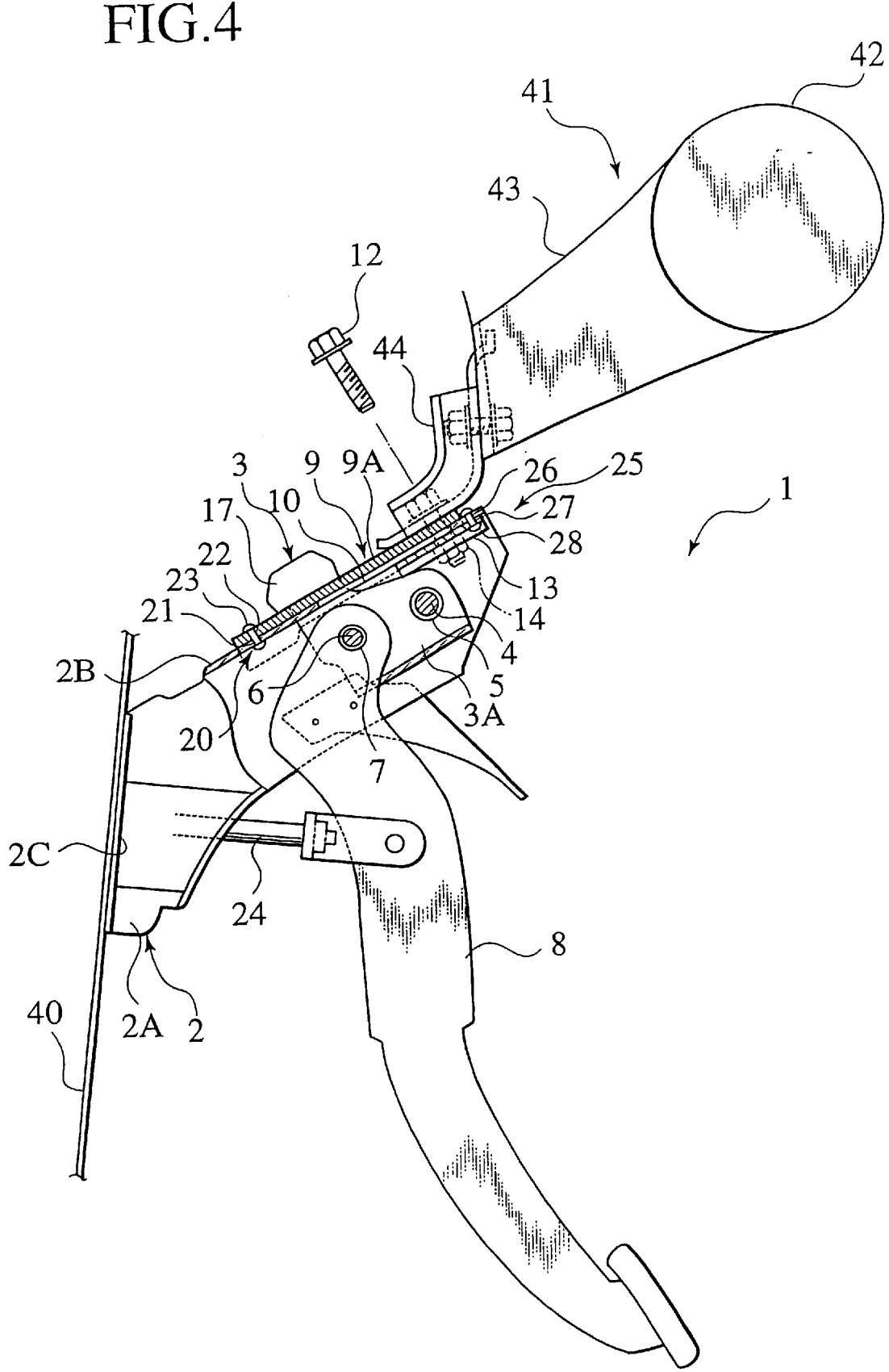
FIG. 4 is a side, cross sectional side view of the brake pedal apparatus shown in FIG. 3.

In the second preferred embodiment shown in FIGS. 3 and 4, the brake pedal apparatus 1 further includes a second releasable connecting section 25 which is constructed of the nut plate 13 and the pedal bracket 2. In particular, the second releasable connecting section 25 is arranged to interconnect the pedal bracket 2 and the nut plate 13 and to release the interconnecting relationship between the pedal bracket 2 and the nut plate 13 responsive to an external force, exerted the pedal bracket 2, exceeding a given load.

More particularly, the second releasable connecting section 25 is constructed of a second shear pin 28 inserted through bores 26, 27 formed in a rearward end of the upper wall portion 2B of the pedal bracket 2 and a rearward end of the nut plate 13, respectively.

With such a structure of the second preferred embodiment of the present invention, in addition to the aforementioned advantages of the first preferred embodiment, the provision of the second releasable connecting section 25 arranged to interconnect the nut plate 13 to the pedal bracket 2 allows the nut plate 13 to be prevented from being subjected to a rickety movement prior to assembling the brake pedal apparatus 1 to the automotive vehicle.

Since the bolt 12 is inserted from upward in a downward direction, the brake pedal apparatus 1, which includes the pedal bracket 2, etc., is fixed to the dash floor panel 40 and subsequently a module, which includes the bracket 43 and the mounting bracket 44 connected to the steering member 42 which forms part of the vehicular body structural member 41 to which the slid plate 9 is fixed, can be mounted to a desired position from a rearward area in the forward direction of the automotive vehicle at once without the need for implementing the coupling work in a worker's creep condition beneath the vehicular body structural member 41 or the brake pedal apparatus 1, thereby improving the working efficiency for assembling the component parts.

A third preferred embodiment of a brake pedal apparatus 1 according to the present invention is described below with reference to FIGS. 5 and 6, with like or similar parts bearing the same reference numerals as those used in FIGS. 1 and 2 and the redundant description of the like parts being omitted for the sake of simplicity.

Figure 5:
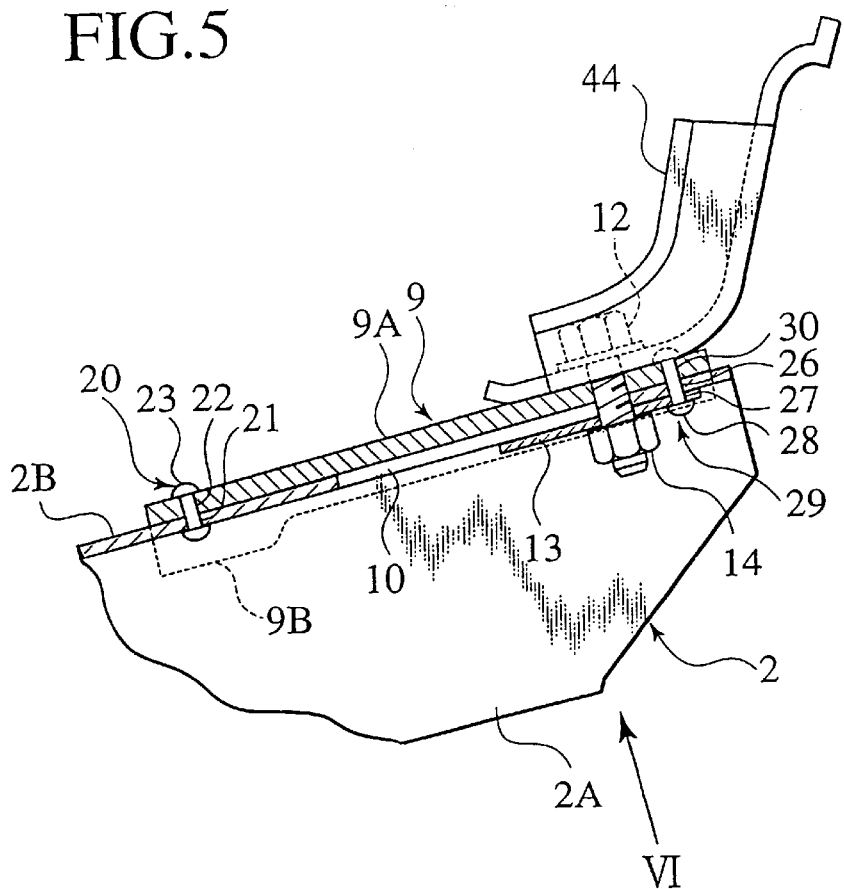
FIG. 5 is a side, cross sectional view of a third preferred embodiment of a brake pedal apparatus according to the present invention.
Figure 6:
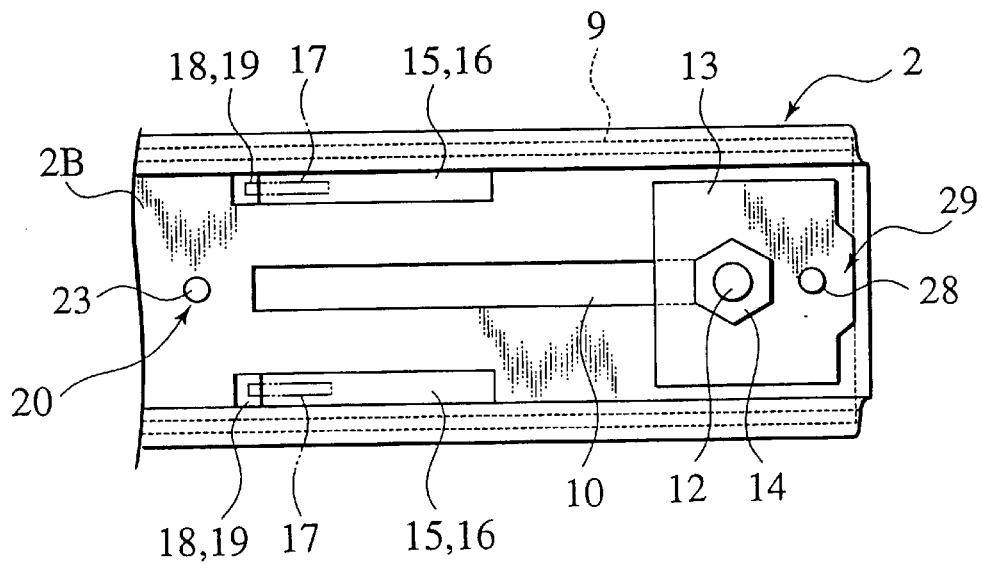
FIG. 6 is a bottom view of the brake pedal apparatus as viewed in an arrow VI in FIG. 5.

In the third preferred embodiment of FIGS. 5 and 6, the brake pedal apparatus further includes a second releasable connecting section 29 which interconnects the pedal bracket 2, the slide plate 9 and the nut plate 13 to one another and which is operative to release the coupling relationship among the pedal bracket 2, the slide plate 9 and the nut plate 13 to allow these elements to move relative to one another when subjected to the external force exceeding a given load exerted in the rearward direction of the automotive vehicle.

In particular, the second releasable connecting section 29 includes a shear pin 28 which is inserted through bolt insertion bores 26, 27, 28 formed in a rear distal end of the upper wall portion 2B of the pedal bracket 2, a rear distal end of the upper wall portion 9A of the slide plate 9 and a rear distal end of the nut plate 13, respectively.

With such a structure of the third preferred embodiment, the presence of the second releasable connecting section 29, which normally keeps the pedal bracket 2, the slide plate 9 and the cut plate 13 in their first fixed position and is operative to release the coupling state of these elements for thereby allowing these elements to move relative to one another responsive to an impact force exceeding the given load exerted to the pedal bracket 2, allows the pedal bracket 2 and the slide plate 9 to move relative to one another at a desired timing in a highly reliable manner while enabling the component parts of the releasable connecting section 29 from suffering the rickety movement during assembling operation of these component parts.

Further, since the bolt 12 is inserted in a vertical orientation from the upward area in the automotive vehicle to couple the pedal bracket 2 to the mounting bracket 44, it is possible to firstly fix the brake-pedal apparatus 1, which involves the pedal bracket 2, etc., to the dash floor panel 40 and to secondly assemble the bracket 43 and the mount bracket 44 to the steering member 42, which forms part of the vehicular body structural member 41, and, thereafter, to mount the brake pedal apparatus 1 to the mounting bracket 44 at one time in a longitudinal orientation from the rearward area of the automotive vehicle, thereby improving the assembling work efficiency of the brake pedal apparatus 1.

Figure 7:
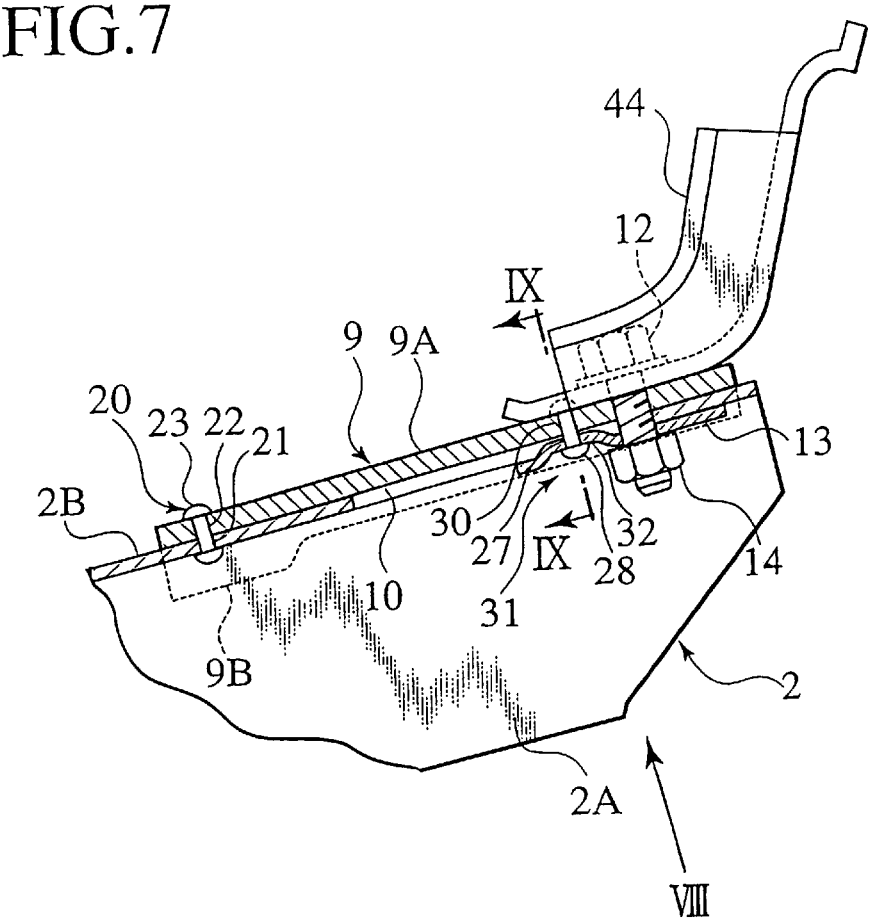
FIG. 7 is a side, cross sectional view of a fourth preferred embodiment of a brake pedal apparatus according to the present invention.
Figure 8:
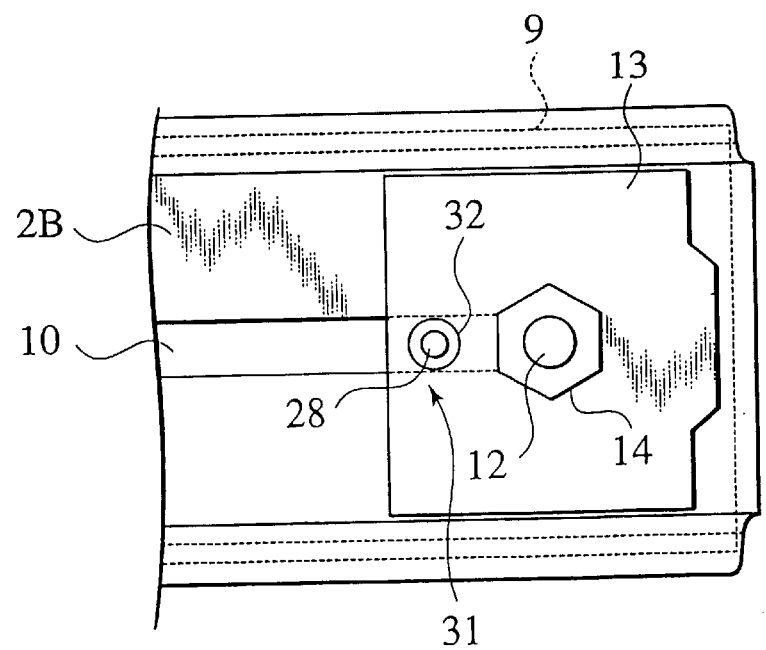
FIG. 8 is a bottom view of the brake pedal apparatus as viewed in an arrow VIII in FIG. 7.
Figure 9:
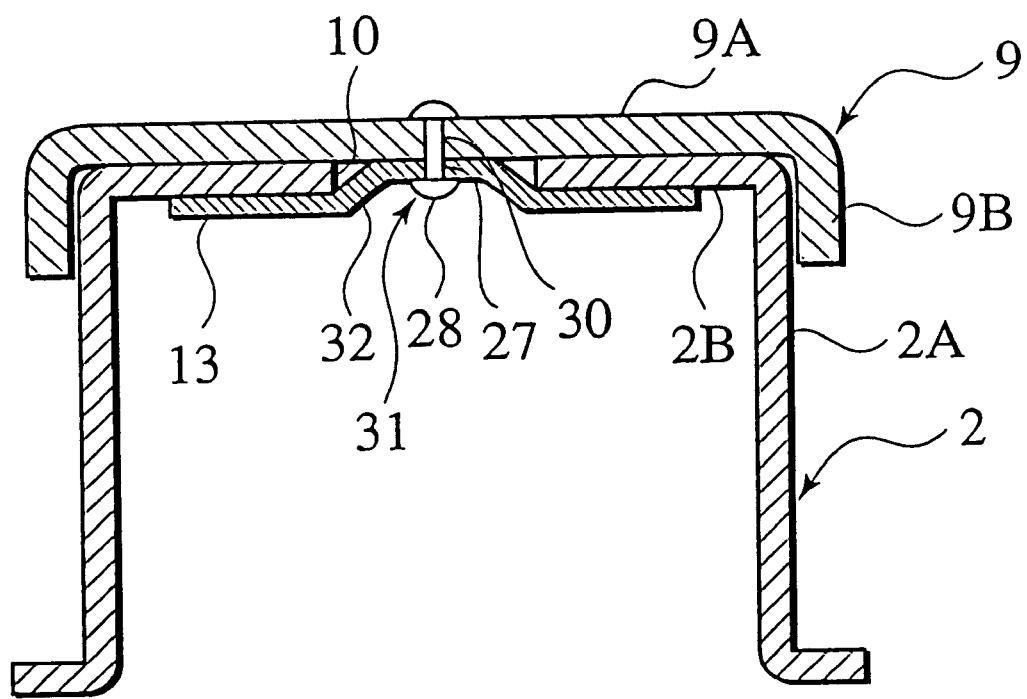
FIG. 9 is a cross sectional view of the brake pedal apparatus taken on line IX—IX of FIG. 7.

FIGS. 7 to 9 show a brake pedal apparatus of a forth preferred embodiment of the present invention, with like or similar parts bearing the same reference numerals as those used in FIGS. 1 and 2 for omitting the redundant description for the sake of simplicity.

In the fourth preferred embodiment, the brake pedal apparatus includes a second releasable connecting section 31 which interconnects the slide plate 9 and the nut plate 13 to one another via the bolt insertion slot 10 formed in the upper wall portion 2B of the pedal bracket 2 in the elongated profile.

More particularly, the second releasable connecting section 31 includes a shear pin 31 which is inserted through bolt insertion bores 30 and 27 formed in the upper wall portion 9A of the slide plate 9 and the nut plate 13 at respective positions forwardly of the bolt 12 and the nut 14 by which the slide plate 9 is fixedly connected to the lower surface of the vehicular body structural member 41, i.e., the mounting bracket 44.

In the fourth preferred embodiment, as best seen in FIG. 7, the nut plate 13 is selected to have a lower thickness than the slide plate 9 and has an embossed portion 32 which protrudes toward the slide plate 9 and which forms part of the second releasable connecting section 31.

The embossed portion 32 of the nut plate 13 is located in the elongated bolt insertion slot 10 formed in the upper wall portion 2B of the pedal bracket 2 and is held in abutting engagement with a lower surface of the slide plate 9.

With such a structure of the fourth preferred embodiment, the presence of the second releasable connecting section 31, which interconnects the nut plate 13 to the slide plate 9, allows the nut plate 13 from suffering the rickety movement prior to assembling the brake pedal apparatus to the automotive vehicle.

Further, since the bolt 12 is inserted in the vertical orientation from the upward area in the automotive vehicle to couple the pedal bracket 2 to the mounting bracket 44, it is possible to firstly fix the brake pedal apparatus 1, which involves the pedal bracket 2, etc., to the dash floor panel 40 and to secondly assemble the bracket 43 and the mount bracket 44 to the steering member 42, which forms part of the vehicular body structural member 41, and, thereafter, to mount the brake pedal apparatus 1 to the mounting bracket 44 at one time in the longitudinal orientation from the rearward area of the automotive vehicle, thereby improving the assembling work efficiency of the brake pedal apparatus 1.

Further, since the second releasable connecting section 31 is located forwardly of the coupling portion composed of the bolt 12 and nut 14, which interconnect the pedal bracket 2 and the slide plate 9 to the mounting bracket 44 of the vehicular body structural member 41, there is no need for preparing a specific mounting area for the bore to insert the shear pin at the position rearward of the coupling portion as required in the second releasable connecting section 25 of the second preferred embodiment and the second releasable connecting section 29 of the third preferred embodiment, thereby enabling the brake pedal apparatus 1 to be manufactured in a small-size.

Since, also, the second releasable connecting section 31 is arranged such that the slide plate 9 and the nut plate 13 are interconnected to one another via the bolt insertion bore 10 having the elongated profile to allow the pedal bracket 2 to lie between the slide plate 9 and the nut plate 13 which are consequently held in the fixed place, it is possible for the slide plate 9 and the pedal bracket 2 from suffering the rickety movement prior to the assembling step of the brake pedal apparatus.

Further, the absence of the need for the releasing operation of the coupling state of the pedal bracket 2 and the slide plate 9 allows an initial load, for which the relative movement of the slide plate 9 is initiated responsive to the impact force exerted to the pedal bracket 2 in the rearward direction of the automotive vehicle at the level exceeding the given load, to be kept in a low level.

In addition, the utilization of the bolt insertion bore 10 having the elongated profile provides the guide by which the slide plate 9 is moved relative to the pedal bracket 2 in a stable fashion. Also, during an initial transition period of the movement of the slide plate 9, since there is no need for the shear pin 28 to be sheared while, at the same time, only the front shear pin 23 may be sheared, it is possible to lower the initial transition load to initiate the relative movement of the slide plate 9. Further, the distance through which the relative movement of the slide plate 9 is performed is ensured to have an adequate value allows the nut plate 13 to be coupled to the slide plate 9 in the coupling state with the normal pin when there is no need for shearing the shear pin 28 at the distal end of the elongated bolt insertion bore 10.

Further, the embossed portion 32 has a profile wherein the frontal edge portion is slanted downward such that when the frontal edge portion of the embossed portion 32 is forced to enter beneath the upper portion 2B of the pedal bracket 2 from the frontal edge of the elongated bolt insertion slot 10 during the late sliding period, the shear pin 28 is readily sheared and is easily removed from the slide plate 9 to be useful for the releasing operation of the second releasable connecting means 31.

Furthermore, since the nut plate 13 is selected to have a lower thickness than the slide plate 9 and the nut plate 13 is formed with the embossed portion 32, which protrudes toward the slide plate 9 and which forms part of the second releasable connecting section 31, the second releasable connecting section 31 can be fabricated in a simple fashion with a reduced cost with the use of the nut plate 13 having the reduced thickness. That is, if the slide plate 9, which has a large thickness to provide a required strength and rigidity, is tried to be formed with the embossed portion 32 which protrudes toward the nut plate 13, although the bolt insertion slot 10 should have an increased width and longitudinal length in order to allow the embossed portion 32 to be located in the bolt insertion slot 10 of the upper wall portion 2B of the pedal bracket 2 to be brought into abutting engagement with the nut plate 13, the utilization of the nut plate 13 having the reduced thickness provides an ease of fabrication of the embossed portion 32 with a reduced flexural center, thereby permitting the size of the bolt insertion slot 10 to be formed in a relatively small value to contribute the compactness of the brake pedal apparatus 1.

Since, also, the embossed portion 32 of the nut plate 13 is located in the elongated bolt insertion slot 10 of the upper portion 2B of the pedal bracket 2 and is held in abutting engagement with the lower surface of the slide plate 9 via the bolt insertion bore 10, the bolt insertion slot 10 provides the guide for enabling the slide plate 9 to move relative to the pedal bracket 2 in a stable fashion.

Figure 10:
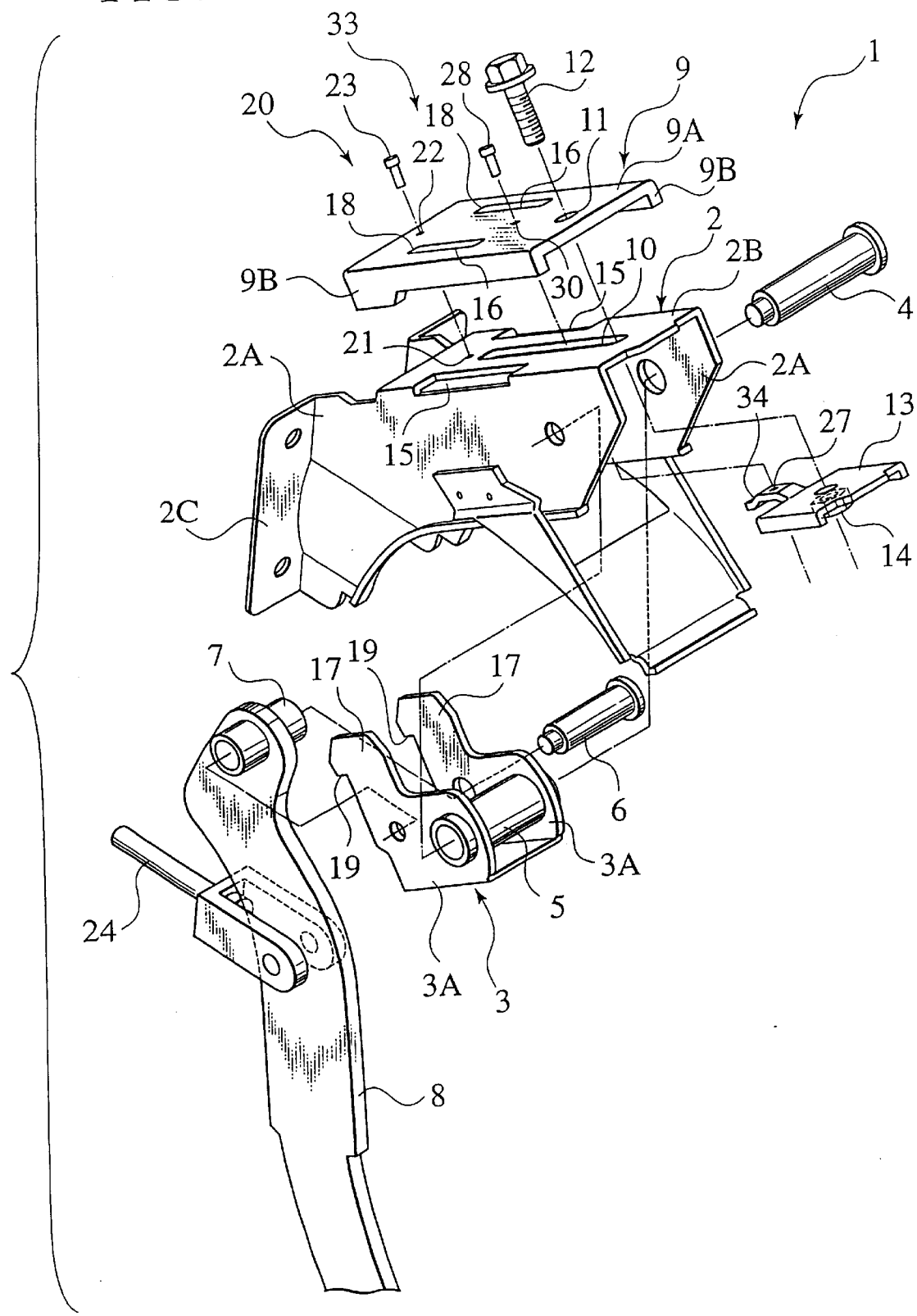
FIG. 10 is a perspective, exploded view of a fifth preferred embodiment of a brake pedal apparatus according to the present invention.
Figure 11:
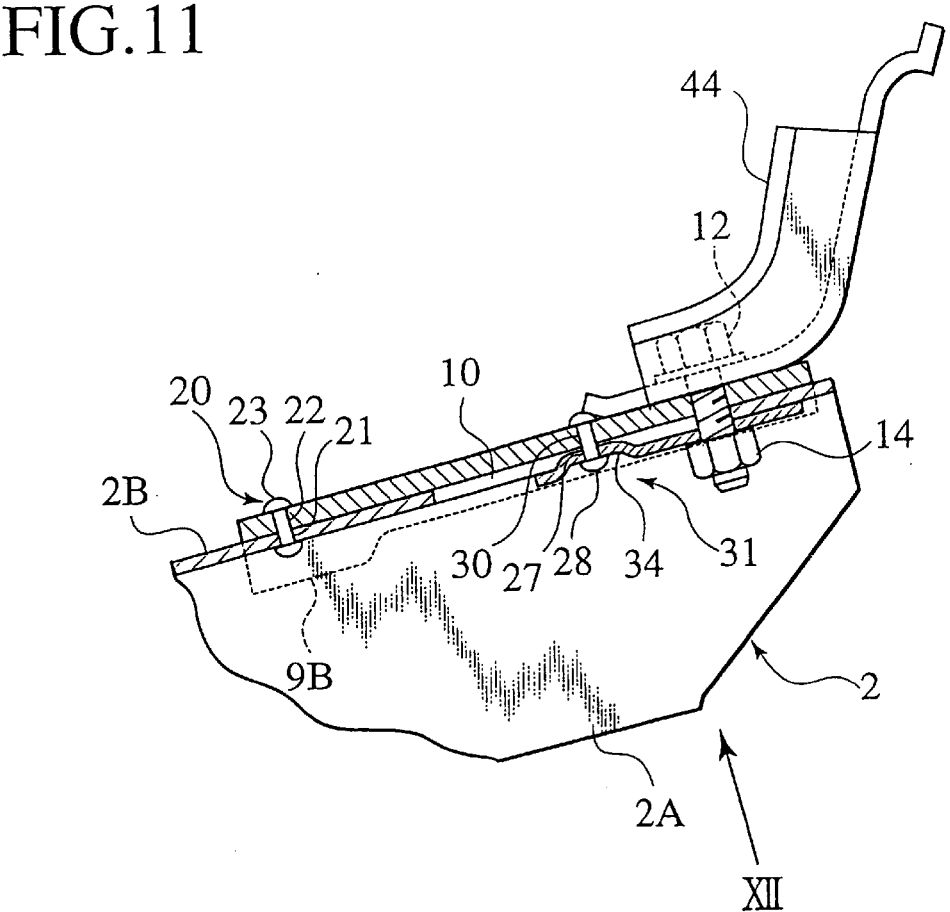
FIG. 11 is a side, cross sectional side view of an essential part of the brake pedal apparatus shown in FIG. 10.

A fifth preferred embodiment of a brake pedal apparatus 1 according to the present invention is described with reference to FIGS. 10 to 11, with like or similar parts bearing the same reference numerals as those used in FIGS. 1 and 2 for omitting the redundant description for the sake of simplicity.

In the fifth preferred embodiment, the brake pedal apparatus 1 includes a second releasable connecting section 31 which interconnects the slide plate 9 and the nut plate 13 to one another via the bolt insertion slot 10 formed in the upper wall portion 2B of the pedal bracket 2 in the elongated profile.

More particularly, the second releasable connecting section 31 includes a shear pin 31 which is inserted through bolt insertion bores 30 and 27 formed in the upper wall portion 9A of the slide plate 9 and the nut plate 13 at respective positions forwardly of the coupling position provided by the bolt 12 and the nut 14 by which the slide plate 9 is fixedly connected to the lower surface of the vehicular body structural member 41, i.e., the mounting bracket 44.

Figure 12:
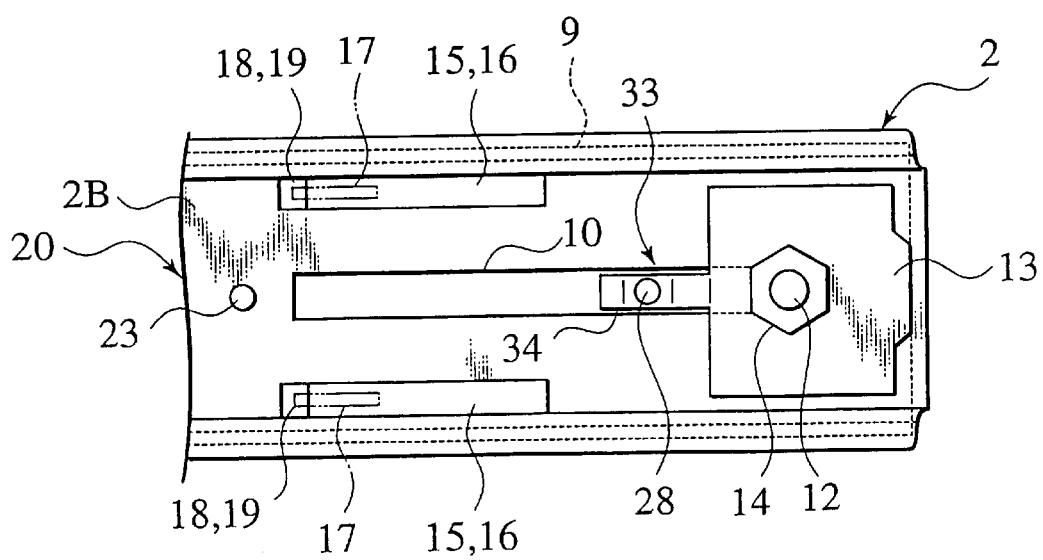
FIG. 12 is a bottom view of the brake pedal apparatus as viewed in an arrow XII shown in FIG. 11.

A fifth preferred embodiment of a brake pedal apparatus 1 according to the present invention is described below with reference to FIGS. 10 to 12, with like or similar parts bearing the same reference numerals as those used in FIGS. 1 and 2 and the redundant description of the like parts being omitted for the sake of simplicity. In the fifth preferred embodiment, the brake pedal apparatus 1 is identical in structure with the fourth preferred embodiment except for the second releasable connecting section In the fifth preferred embodiment, the brake pedal apparatus 1 includes a second releasable connecting section 33 which interconnects the slide plate 9 and the nut plate 13 via the elongated bolt insertion bore 10 formed in the upper wall portion 2B of the pedal bracket 2.

In particular, the second releasable connecting section 33 is constructed of a shear pin 28 which is inserted though insertion bores 30, 27 formed in the upper wall portion 9A of the slide plate 9 and the nut plate 13, respectively, at their respective positions forwardly of the coupling position provided by the bolt 12 and the nut 14 which fixedly couple the slide plate 9 to the lower surface of the vehicular body structural member 41 (i.e., the mounting bracket 44).

In the fifth preferred embodiment, the nut plate 13 is selected to have a lower thickness than the slide plate 9 and has a tongue-shaped segment 34, which protrudes toward the slide plate 9 and which forms part of the second releasable connecting section 33.

The tongue-shaped segment 34 is formed so as to extend from its forward distal end in a forward direction of the automotive vehicle and is located in the elongated bolt insertion slot 10 formed in the upper wall portion 2B of the pedal bracket 2 in abutting engagement with the lower surface of the slide plate 9.

In accordance with the fifth preferred embodiment, the brake pedal apparatus 1 has the same advantages as obtained as the fourth preferred embodiment and has, in addition thereto, an additional advantage. That is, the presence of the tongue-shaped segment 34 which longitudinally protrudes from the forward edge of the nut plate 13 provides an ease of fabrication of the tongue-shaped segment 34 integral with the nut plate 13 which is consequently formed in a minimum size, with a resultant compactness in the pedal bracket 2, because of a reduced width of the elongated bolt insertion slot 10 which does not need to accommodate the rounded portion of the embossed segment 33, for thereby minimizing the width of the upper wall portion 2B of the pedal bracket 2 to a value as small as possible while enabling another advantage to be provided in terms of the weight of the pedal bracket 2. A forward distal end of the tongue-shaped segment 34 is formed in a profile which is obliquely bent downward to allow the forward distal end of the tongue-shaped segment 34 to move through the elongated bolt insertion slot 10 toward a position beneath the upper wall portion 2B of the pedal bracket 2 to assist the shearing of the shear pin 28 and the separation of the same from the slide plate 9 to be useful for releasing the coupling state between the slide plate 9 and the pedal bracket 2.

Figure 13:
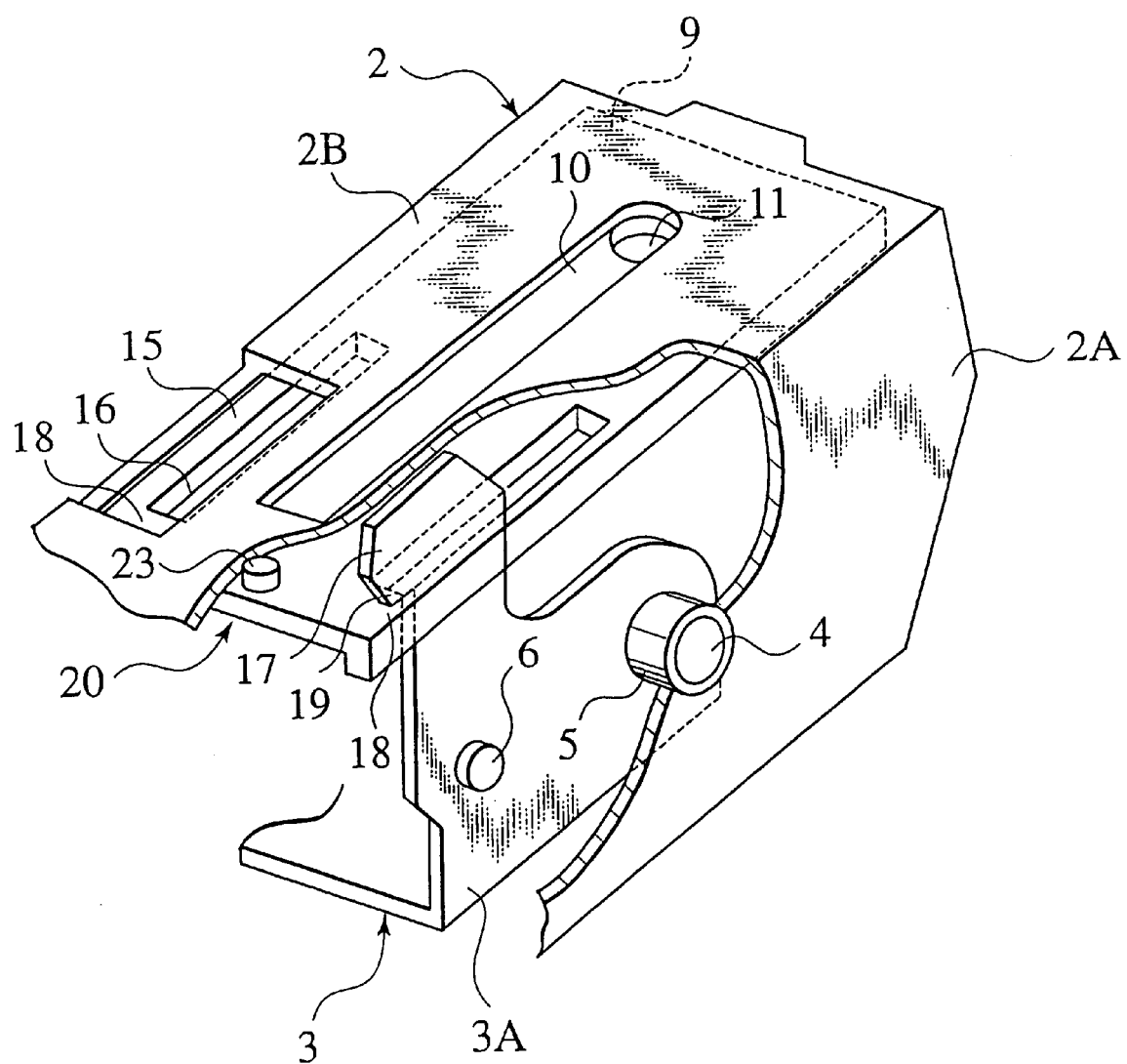
FIG. 13 is a partially cut away, perspective view of an essential part of a sixth preferred embodiment of a brake pedal apparatus according to the present invention.
Figure 14:
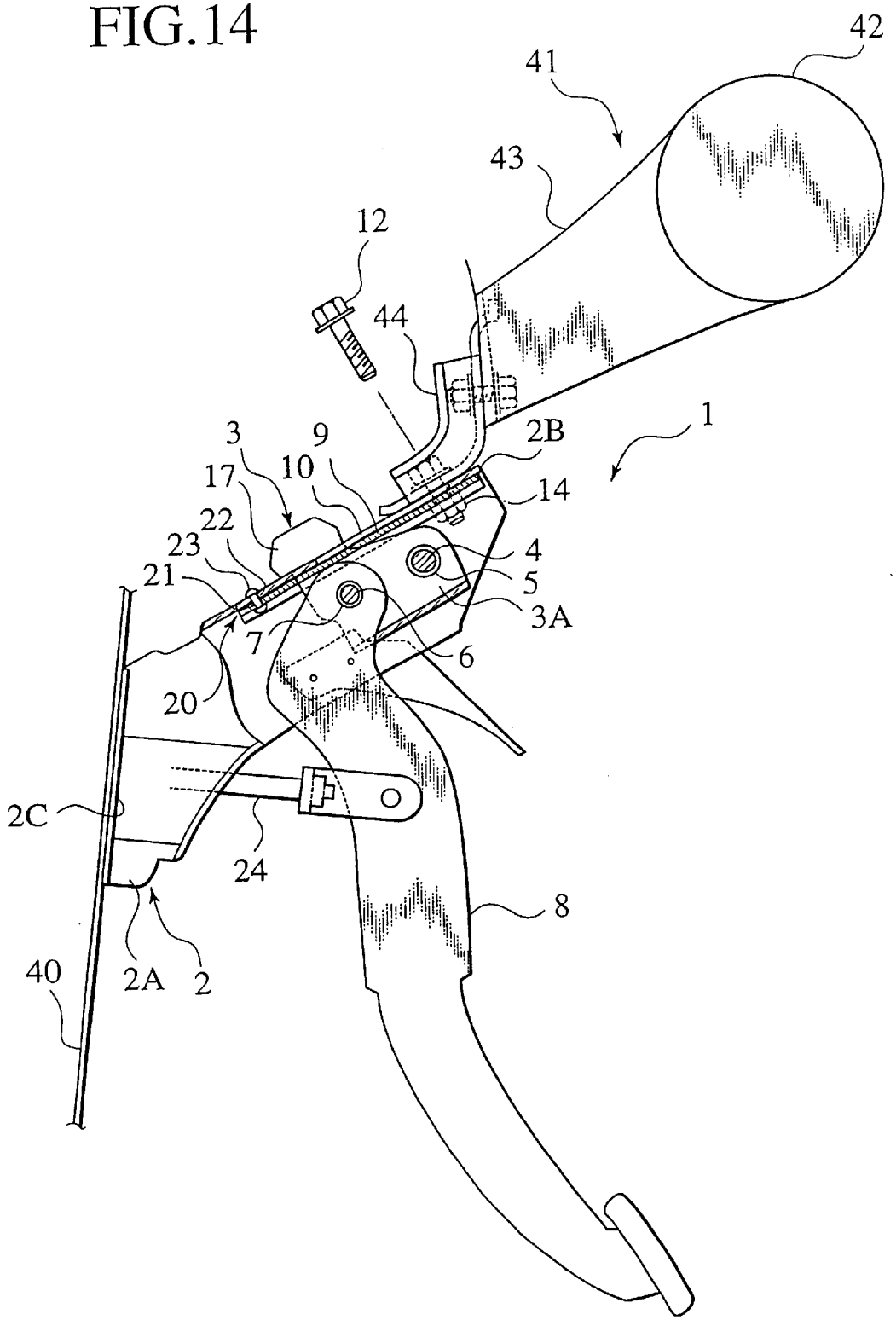
FIG. 14 is a cross sectional side view of the brake pedal apparatus incorporating the essential part shown in FIG. 13.
Figure 15:
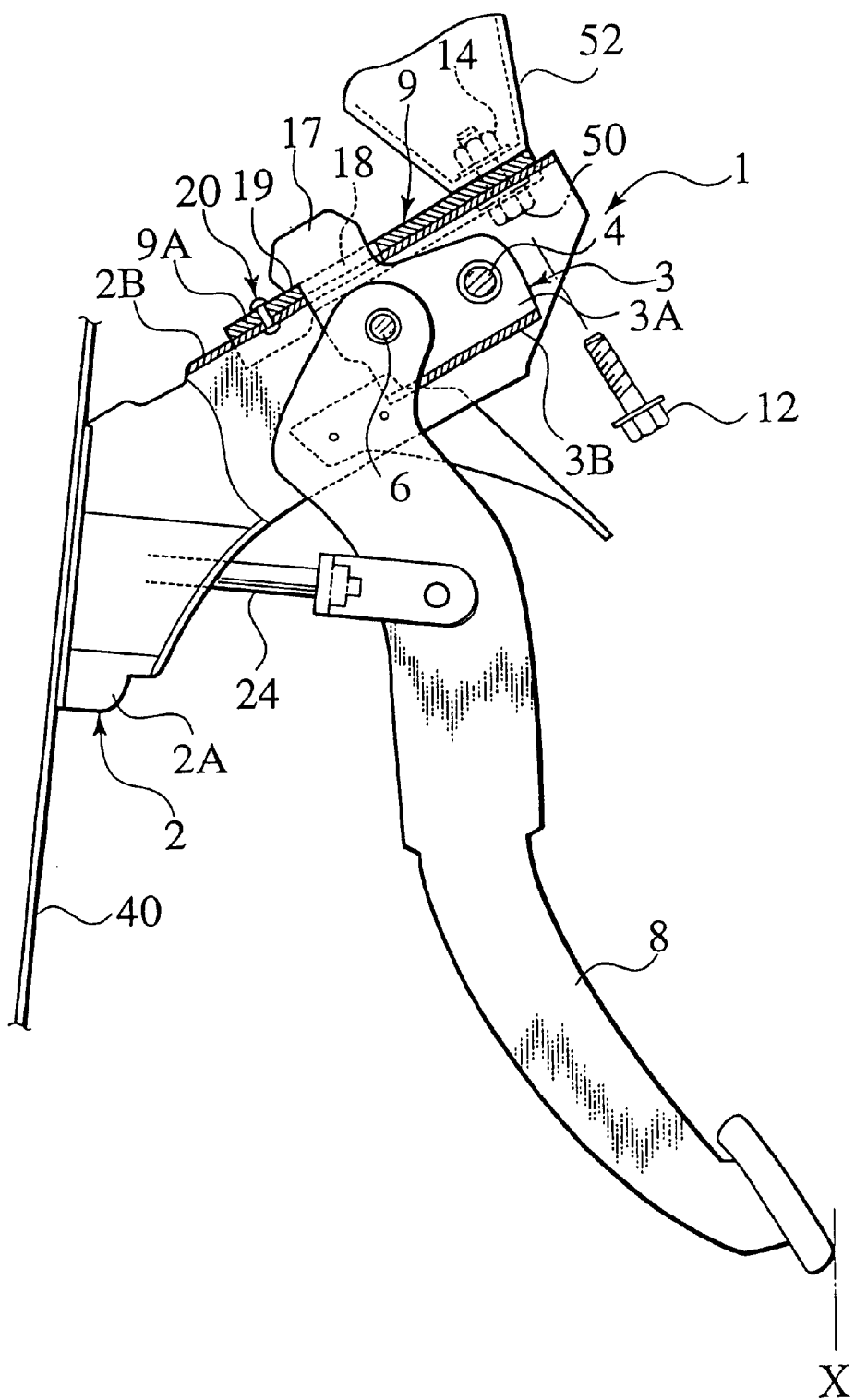
FIG. 15 is a cross sectional side view of a seventh preferred embodiment of a brake pedal apparatus according to the present invention, with the brake pedal apparatus being shown in its normal condition.

A sixth preferred embodiment of a brake pedal apparatus 1 according to the present invention is described below with reference to FIGS. 13 and 14, wherein the brake pedal apparatus 1 is identical with the first preferred embodiment with the exception for the slide plate 9, with like or similar parts bearing the same reference numerals as those used in FIGS. 1 and 2 and the redundant description of the like parts being omitted for the sake of simplicity. In the sixth preferred embodiment, the brake pedal apparatus 1 is identical in structure with the fourth preferred embodiment except for the second releasable connecting section In the sixth preferred embodiment, the brake pedal apparatus 1 has the slide plate 9 which is located below the upper wall portion 2B of the pedal bracket 2 in engagement therewith.

In particular, a lower surface of the slide plate 9 has the nut 14 welded thereto for fixedly connecting the slide plate 9 to the lower surface of the vehicular body structural member 41.

In accordance with the sixth preferred embodiment, the brake pedal apparatus 1 has the same advantages of the first preferred embodiment and also has, in addition thereto, another advantage. That is, the presence of the slide plate 9 located in engagement with the lower surface of the upper wall portion 2B of the pedal bracket 2 renders moveable parts, which move responsive to the impact force beyond the given load exerted to the pedal bracket 2 in the rearward direction of the automotive vehicle during the frontal collision of the vehicle, to rest inside the pedal bracket 2 such that an outer appearance of the brake pedal apparatus 1 is highly improved and that it is possible for the slide plate 9 and its peripheral component parts to be prevented from interfering with one another to allow the slide plate 9 to move relative to the pedal bracket 2 in a stable fashion.

Further, the presence of the nut 14 welded to the lower surface of the slide plate 9 as a fixture member enables an additional specific component part such as the nut plate to be dispensed with, resulting in the brake pedal apparatus having a simplified structure with a reduced cost.

In any of the first to fifth illustrated embodiments discussed above, further, although the present invention has been shown and described in the case where the pedal bracket 2 is fixed to the lower wall of the mounting bracket 44 which is connected to the bracket 43 extending from the steering member 42, the present invention is not limited thereto and the brake pedal apparatus of the present invention may be fixed to the other vehicular body structural part such as a dash upper panel which extends upward in the rearward direction of the vehicle from the dash floor panel 40.

In the first to fifth preferred embodiments discussed above, although the present invention has been shown and described as having the nut plate 13 wherein the nut is fixedly secured to the nut plate 13 to form a coupling plate member, a modification may be made such that a fixture bolt is directly fixed to the nut plate 13 and is coupled to a nut located the mounting bracket 44 of the vehicular body structural member 41. In the sixth preferred embodiment, further, the bolt may be directly fixed to the lower wall of the slide plate 9 in place of the nut 14 secured to the nut plate 13. In these cases, furthermore, the mounting bracket 44 may be formed with a bolt insertion slot having its front end formed in an opened state to have a U-shaped profile. As a result, a module of the steering member and its associated component parts can be avoided from unnecessarily interfering with the bolt, which extends upward from the pedal bracket 2, during mounting operation of the module to the vehicle body at one time from the rearward area.

A seventh preferred embodiment of a brake pedal apparatus 1 according to the present invention is described below with reference to FIGS. 15 to 18, with like or similar parts bearing the same reference numerals as those used in FIGS. 1 and 2 and the redundant description of the like parts being omitted for the sake of simplicity.

In the seventh preferred embodiment, the brake pedal apparatus 1 includes a restrictor section 50, composed of the bolt 12 which is screwed into the nut 14 located on a mounting bracket 52 which is located below and joined to the dash upper panel (not shown). The restrictor section 50 is held in the first position shown in FIGS. 15 and 17 and is operative to move with the dash upper panel, which forms part of the vehicular body structural member, in the second position shown in FIG. 16 in response to the impact force exerted to the pedal bracket 2 at a value beyond the given load in the rearward direction of the automotive vehicle.

In the seventh preferred embodiment, more particularly, the restrictor section 50 is formed of a bottom wall of the bolt 12 which couples the slide plate 9 to the mounting bracket 52. With such a structure, in the event that the pivot bracket 3 is caused to disengage from the slide plate 9 by some rare accident for some reasons, a bottom wall portion 3B of the pivot bracket 3 is brought into abutting engagement with the restrictor section 50 as viewed in FIGS. 17 and 18 to restrict the pivotal movement of the pivot bracket 3 at a given angle $\alpha$ so as to allow the pedal arm 8 to be depressed in a predefined stroke defined by a restricting position (Z).

In the seventh preferred embodiment, further, the restrictor section 50 is located at a position above the shaft 4 of the pivot bracket 3.

Figure 16:
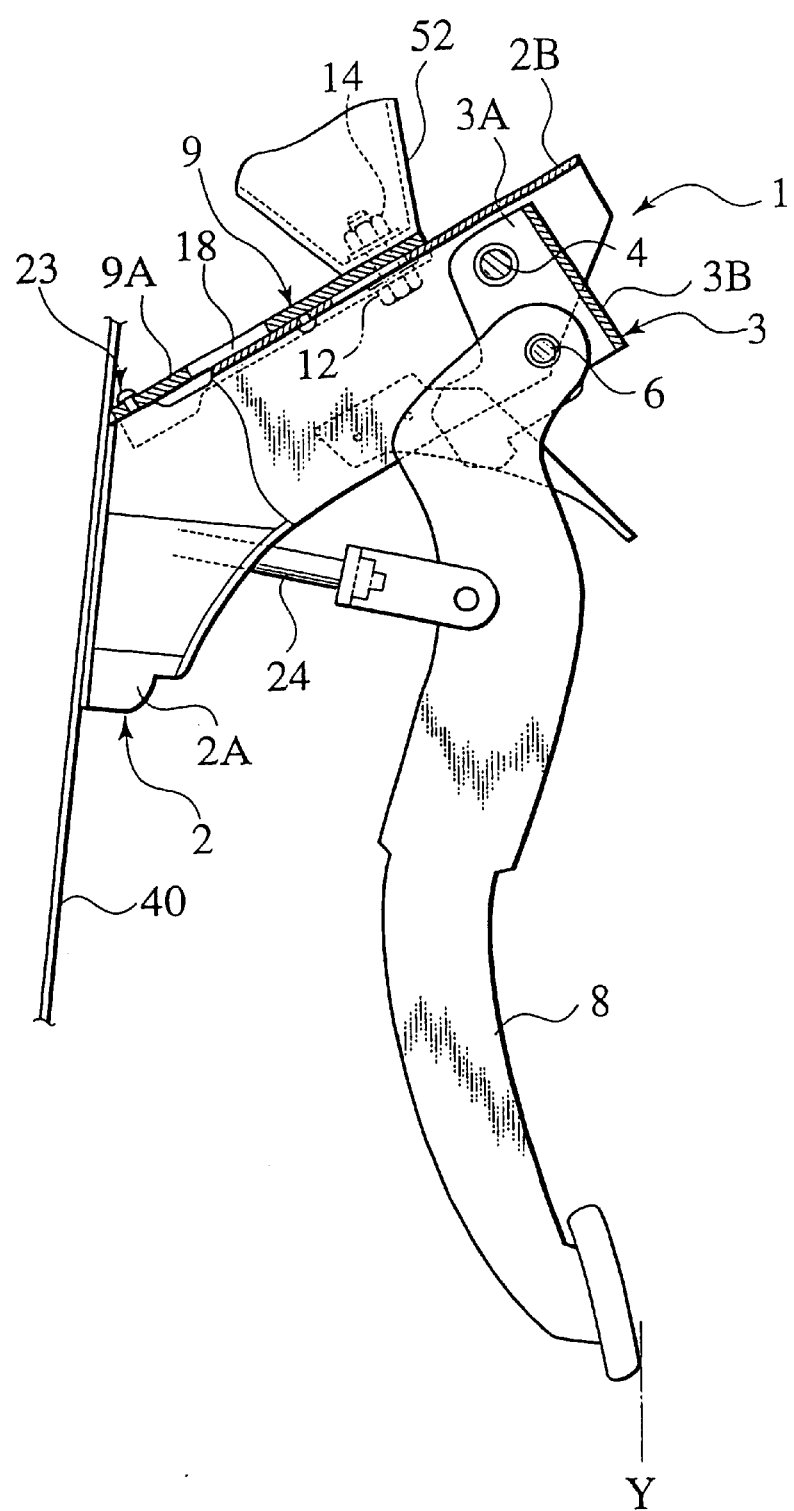
FIG. 16 is a cross sectional side view of the brake pedal apparatus according to the present invention, with the brake pedal apparatus being shown in an operative condition during a collision of a vehicle.
Figure 17:
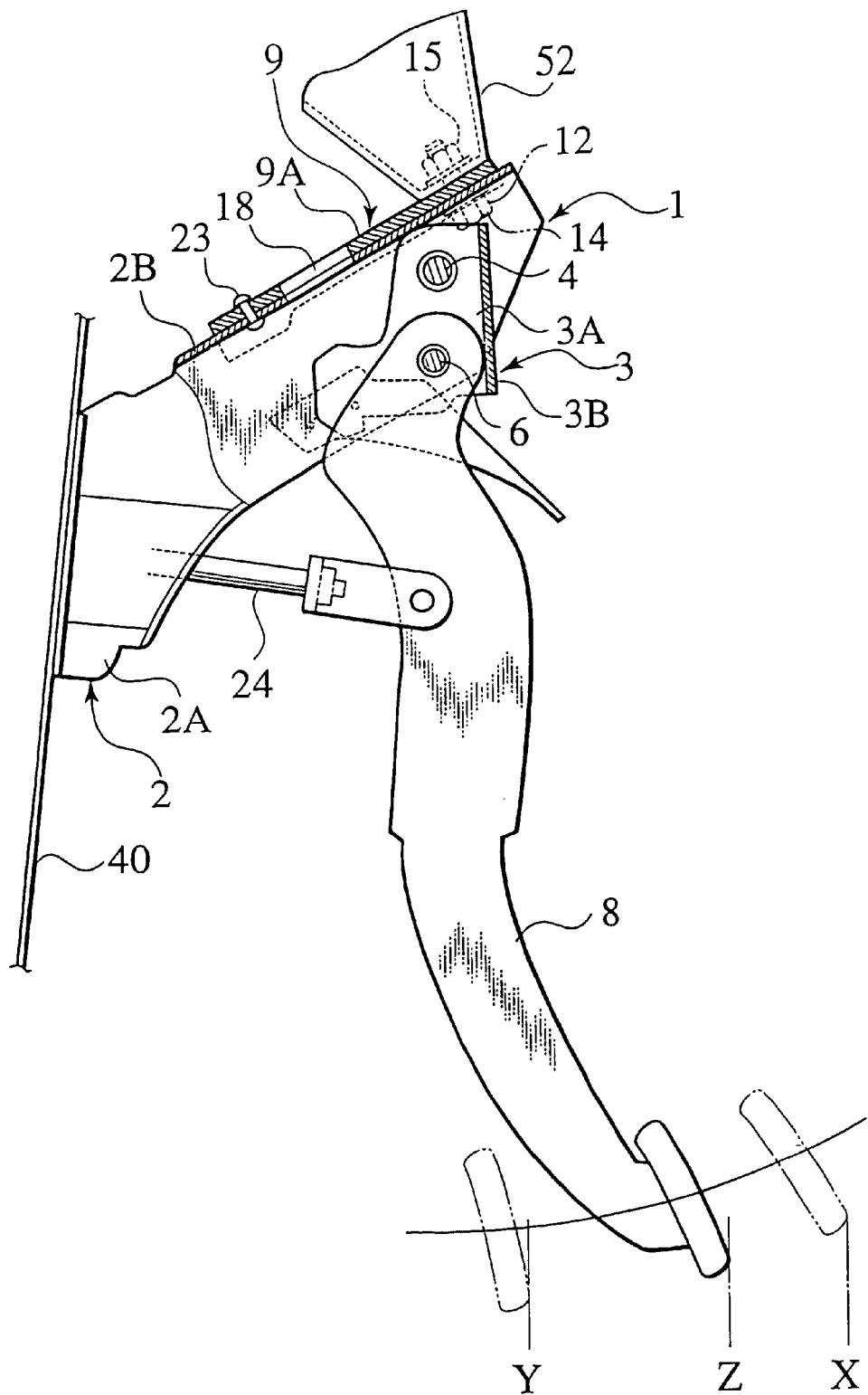
FIG. 17 is a cross sectional side view of the brake pedal apparatus according to the present invention for illustrating the operation of restricting a pivotal movement of a pivot bracket in the normal condition.

With such a structure in the seventh preferred embodiment, in a normal condition, since the pivotal movement of the pivot bracket 3 is restricted with the slide plate 9 such that the pedal arm 8 assumes the position as shown in FIG. 16. It is thus possible for the pedal arm 8 to rotate about the center of the shaft 6 to render the normal master vac. operation via the push rod 24 connected to the pedal arm 8.

During a frontal impact of the automotive vehicle, the pedal bracket 2 is moved in the rearward direction of the automotive vehicle along the elongated bolt insertion slot, which serves as the impact absorbing means, to permit the contracting deformation of the vehicular body structural, thereby causing the slide plate 9, which is fixed to the dash upper panel (not shown), to be guided by the upper wall portion 2B of the pedal bracket 2 and to be moved forward relative to the pivot bracket 3. As a result, the pivot bracket 3 disengages from the slide plate 9 to allow the pivot bracket 3 to rotate about the center of the shaft 4 in the counterclockwise direction for thereby retracting the depressing position of the pedal arm 8 in the forward direction of the automotive vehicle. Thus, even when the master vac. device (not shown) is moved rearward or the push rod 24 of the master vac. (not shown) is moved rearward owing to the deformation of the dash floor panel 40 into a vehicle compartment, it is possible for the depressing position of the pedal arm 8 to be shifted rearward within a limited range for thereby minimizing a feeling of physical disorder in the operation of the pedal arm 8.

In the seventh preferred embodiment, more specifically, since the restrictor section 50 is constructed by the lower surface of the bolt 12 which fixedly couples the slide plate 9 and the lower surface of the mounting bracket 52, there is no need for preparing an additional specific component part to reduce the manufacturing cost. Also, when the pedal bracket 2 is exerted with the impact force in the rearward direction of the automotive vehicle at a level beyond the given load during the frontal collision of the vehicle, the restrictor section 50 is shifted to avoid the interference between the restrictor section 50 and the pivot bracket 3 for thereby allowing the pivot bracket 2 to rotate in the counterclockwise direction.

A modified form of the brake pedal apparatus is described with reference to FIG. 19, with like or similar component parts bearing the same reference numerals as those used in FIGS. 15 to 18 to omit the redundant description of the like parts for the sake of simplicity.

Figure 19:
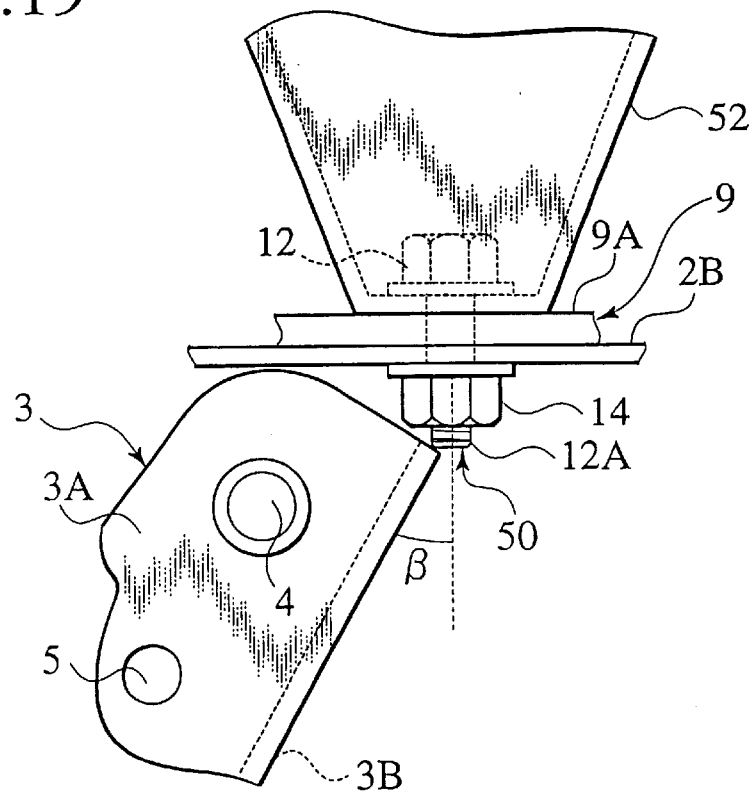
FIG. 19 is an enlarged cross sectional view of an essential part of a modified form of the brake pedal apparatus shown in FIG. 15.

In the modification shown in FIG. 19, a rear end portion of the slide plate 9 and a rear end portion of the upper wall portion 2B of the pedal bracket 2 are fixedly secured to the lower surface of the mounting bracket 52, which is joined to the lower surface of the dash upper panel (not shown), by means of the bolt 12 and the nut 14. That is, a threaded portion 12A of the nut 12 is located below the upper wall portion 2B of the pedal bracket 2, with the threaded portion 12A forming the restrictor section 50.

Figure 18:
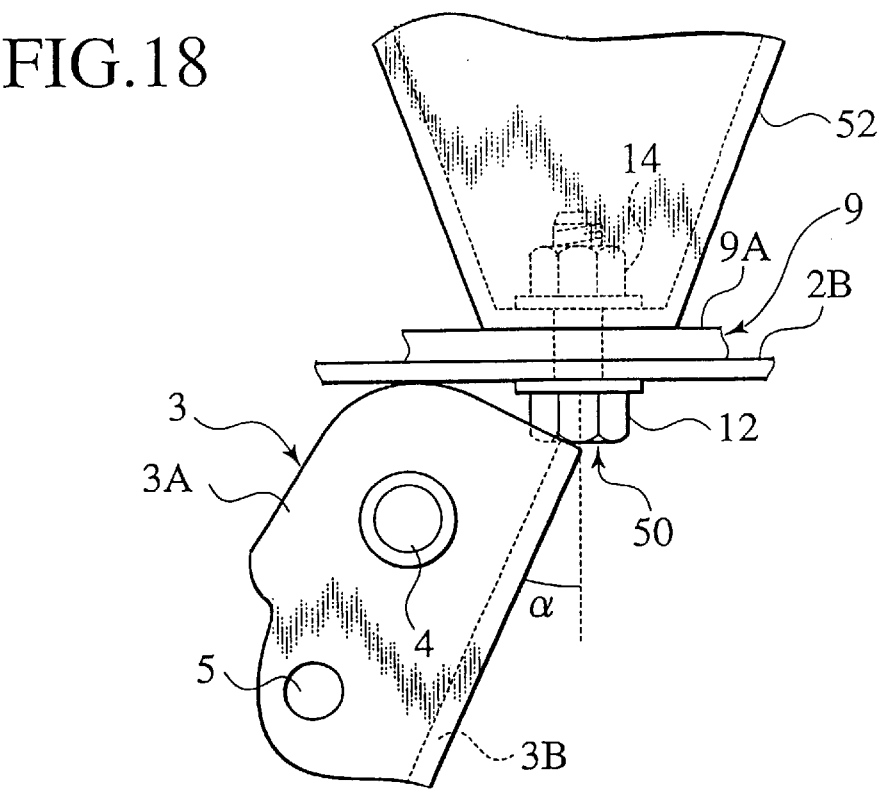
FIG. 18 is an enlarged cross sectional view of an essential part of the brake pedal apparatus shown in FIG. 15.

With such a structure, the presence of the restrictor section 50 formed with the threaded portion 12A of he nut 12 enables the restrictor section 52 to be located at a lower point than the head of the nut 12 shown in FIG. 18, it is possible for the rotation of the pivot bracket 3 to be restricted to a given angle $\beta(\beta>\alpha)$ for minimizing the variation in the depressing position of the pedal arm in the restricted mode of the rotation of the pivot bracket 3.

In the seventh preferred embodiment and its modification, although the pedal bracket 2 has been exemplarily shown and described as applied to the lower surface of the dash upper panel, the present invention is not limited thereto and may be fixed to the vehicular structural member such as the steering member which is located in the upper and rearward position of the dash floor panel 40 and which extends in the widthwise direction of the automotive vehicle.

Industrial Applicability

As described above, in the present invention, a pedal bracket of the brake pedal apparatus is fixedly connected to a lower surface of a vehicular body structural member, with a slide plate and a pedal bracket being fixedly connected to the lower surface of the vehicular body structural member and remaining in a first retaining position during a normal cruising of an automotive vehicle. The brake pedal apparatus is operative to allow the slide plate and the pedal bracket to move relative to one another to assume a second retaining position during a frontal collision of the automotive vehicle. In the second retaining position of the pedal bracket, a pivot bracket is held in a suitable position to allow a pedal arm to provide a comfortable depressing position for a driver. Therefore, a wide applicability thereof including a brake pedal apparatus for an automotive vehicle is expected.

The entire content of a Japanese Patent Application No. P2000-280850 and No. P2000-280855 both with a filing date of Sep. 14, 2000 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A brake pedal apparatus for an automotive vehicle having a dash floor panel and a vehicular body structural member, comprising:

a pedal bracket fixedly secured to a dash floor panel and at a coupling position to a lower wall portion of a vehicular body structural member and carrying thereon a pivot shaft;

a pivot bracket pivotally supported on the pivot shaft and having a pedal shaft;

a pedal arm pivotally supported on the pedal shaft;

a slide plate held in slidable engagement with the pedal bracket;

an impact absorbing section located between the coupling position and the pivot shaft to permit a relative movement of at least the pivot shaft and the lower wall portion of the vehicular body structural member in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft; and a releasable connecting section coupling at least the slide plate and the pedal bracket to one another and operative to release a coupling state between the slide plate and the pedal bracket when the pedal bracket encounters the impact force exerted rearward at the level beyond the given load, wherein the connecting section is located in respective forward end portions of the slide plate and the pivot bracket.

2. A brake pedal apparatus according to claim 1, wherein the pedal bracket has a pair of opposing side wall portions formed in a spaced relationship and an upper wall portion coupled to respective upper edges of the side wall portions to forma a C-shaped configuration in cross section, wherein the connecting section is located on the upper wall portion of the pedal bracket, and wherein the pivot bracket has at least one projective segment and the upper wall portion of the pedal bracket has at least one opening to pass the projective segment for allowing the projective segment to be held in engagement with the slide plate.

3. A brake pedal apparatus according to claim 2, further comprising:

a coupling fixture member fixedly coupling the slide plate and the upper wall portion of the pedal bracket to the lower wall portion of the vehicular body structural member; and wherein the impact absorbing section is composed of an elongated insertion slot formed in the upper wall portion of the pedal bracket, and the coupling fixture member inserted through the elongated insertion slot to allow the pedal bracket and the slide plate to move relative to one another along the elongated insertion slot.

4. A brake pedal apparatus according to claim 3, wherein the connecting section is located on a line extending from the elongated insertion slot.

5. A brake pedal apparatus according to claim 2, wherein the slide plate is located on an upper surface of the upper wall portion of the pedal bracket.

6. A brake pedal apparatus according to claim 5, wherein the slide plate has a pair of spaced flanges to form a C-shaped configuration in cross section.

7. A brake pedal apparatus according to claim 5, further comprising:
- a nut plate located at a lower surface of the slide plate and having one fixture element of the coupling fixture member; and
- a second releasable connecting section—interconnecting a retaining plate to at least one of the pedal bracket and the slide plate;
- wherein the slide plate and the retaining plate are enabled to be coupled to the lower wall portion of the vehicle body structural member with the one fixture element and the other fixture element of the coupling fixture member.

8. A brake pedal apparatus according to claim 7, wherein the second connecting section is located in a position forwardly of the coupling position between the slide plate and the lower wall portion of the vehicular body structural member.

9. A brake pedal apparatus according to claim 7, wherein the second connecting section interconnects the slide plate and the retaining plate via the elongated insertion slot of the upper wall portion of the pedal bracket.

10. A brake pedal apparatus according to claim 7, wherein the second releasable connecting section includes an engaging segment formed in the retaining plate and extending toward the slide plate.

11. A brake pedal apparatus according to claim 10, wherein the engaging segment of the second releasable connecting section protrudes from a distal edge of the retaining plate.

12. A brake pedal apparatus according to claim 10, wherein the engaging segment of the second releasable connecting section is located in the elongated insertion slot of the upper wall portion of the pedal bracket and is held in abutting contact with the slide plate via the elongated insertion slot.

13. A brake pedal apparatus according to claim 7, wherein the second releasable connecting section couples the pedal bracket and the slide plate to the retaining plate and releases a coupling state between—at least the retaining plate and the slide plate and the pedal bracket to allow the retaining plate and the slide plate to move relative to the pedal bracket when the pedal bracket encounters the impact force beyond the given load.

14. A brake pedal apparatus according to claim 2, wherein the slide plate is located at a lower side of the upper wall portion of the pedal bracket.

15. A brake pedal apparatus according to claim 14, wherein the coupling fixture member is located at a lower side of the slide plate.

16. A brake pedal apparatus for an automotive vehicle having a dash floor panel and a vehicular body structural member, comprising:
- a pedal bracket fixedly secured to a dash floor panel and at a coupling position to a lower wall portion of a vehicular body structural member and carrying thereon a pivot shaft;
- a pivot bracket pivotally supported on the pivot shaft and having a pedal shaft;
- a pedal arm pivotally supported on the pedal shaft;
- a slide plate held in slidable engagement with the pedal bracket;
- an impact absorbing section located between the coupling position and the pivot shaft to permit a relative movement of at least the pivot shaft and the lower wall portion of the vehicular body structural member in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot-shaft;
- a restrictor section located—at a coupling point and engaging with a part of the pivot bracket to restrict a pivotal movement thereof in a counterclockwise direction under a condition where the pedal bracket remains in a normal position relative to the vehicular body structural member, the restrictor section being operative to move with the vehicular body structural member relative to the part of the pivot bracket when the pedal bracket encounters the impact force exceeding the given load exerted in the rearward direction of the automotive vehicle; and
- a fixture coupling member composed of a bolt inserted from an upward position of the automotive vehicle to fixedly connect the slide plate and the pedal bracket to the vehicular body structural member, wherein the restrictor section includes a threaded portion of the bolt.

17. A brake pedal apparatus according to claim 16, wherein the pivot bracket has a substantially C-shaped configuration in cross section having a lower wall portion extending beneath the pivot shaft, and wherein the restrictor section is located in a position above the pivot shaft.

18. A brake pedal apparatus for an automotive vehicle having a dash floor panel and a vehicular body structural member, comprising:
- a pedal bracket fixedly secured to a dash floor panel and at a coupling position to a lower wall portion of a vehicular body structural member and carrying thereon a pivot shaft;
- a pivot bracket pivotally supported on the pivot shaft and having a pedal shaft;
- a pedal arm pivotally supported on the pedal shaft;
- a slide plate held in slidable engagement with the pedal bracket;
- impact absorbing means allowing at least the pivot shaft and the lower wall portion of the vehicular body structural member to move relative to one another in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft; and
- releasable connecting means coupling at least the slide plate and the pedal bracket to one another and operative to release a coupling state between the slide plate and the pedal bracket when the pedal bracket encounters the impact force exerted rearward at the level beyond the given load, wherein the connecting means is located in respective forward end portions of the slide plate and the pivot bracket.

19. A brake pedal apparatus for an automotive vehicle having a dash floor panel and a vehicular body structural member, comprising:

a pedal bracket fixedly secured to a dash floor panel and at a coupling position to a lower wall portion of a vehicular body structural member and carrying thereon a pivot shaft;

a pivot bracket pivotally supported on the pivot shaft and having a pedal shaft;

a pedal arm pivotally supported on the pedal shaft;

a slide plate held in slidable engagement with the pedal bracket;

impact absorbing means allowing at least the pivot shaft and the lower wall portion of the vehicular body structural member to move relative to one another in a fore and aft direction of an automotive vehicle for thereby absorbing an impact energy when the pedal bracket encounters an impact force exerted rearward in a vehicle compartment at a level beyond a given load such that when the pivot shaft and the coupling position are moved in a contracted condition relative to one another, the pivot bracket disengages from the slide plate to allow the pivot bracket to rotate counterclockwise about the center of the pivot shaft;

restrictor means restricting a pivotal movement thereof in a counterclockwise direction under a condition where the pedal bracket remains in a normal position relative to the vehicular body structural member, the restrictor section being operative to move with the vehicular body structural member relative to the part of the pivot bracket when the pedal bracket encounters the impact force exceeding the given load exerted in the rearward direction of the automotive vehicle; and a fixture coupling means composed of a bolt inserted from an upward position of the automotive vehicle to fixedly connect the slide plate and the pedal bracket to the vehicular body structural member, wherein the restrictor means includes a threaded portion of the bolt.

* * * * *

UNITED STATES PATENT AND TRADEMARK OFFICE
CERTIFICATE OF CORRECTION

PATENT NO. : 6,742,411 B2
DATED : June 1, 2004
INVENTOR(S) : Tsutomu Aoki et al.

It is certified that error appears in the above-identified patent and that said Letters Patent is hereby corrected as shown below:

<u>Title page,</u>
Item [73], Assignee, add -- F. TECH INCORPORATION, Saitama-Ken (JP) --.

Signed and Sealed this

Eighteenth Day of October, 2005

JON W. DUDAS
*Director of the United States Patent and Trademark Office*